(12) United States Patent
Choi et al.

(10) Patent No.: US 9,888,419 B2
(45) Date of Patent: Feb. 6, 2018

(54) METHODS AND DEVICES FOR PERFORMING FAST FALLBACK IN WIRELESS ACCESS SYSTEM SUPPORTING MILLIMETER WAVES (MMWAVE)

(71) Applicant: LG ELECTRONICS INC., Seoul (KR)

(72) Inventors: Kukheon Choi, Seoul (KR); Jaehoon Chung, Seoul (KR); Genebeck Hahn, Seoul (KR); Eunjong Lee, Seoul (KR); Jinmin Kim, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/517,821

(22) PCT Filed: Oct. 15, 2015

(86) PCT No.: PCT/KR2015/010920
§ 371 (c)(1),
(2) Date: Apr. 7, 2017

(87) PCT Pub. No.: WO2016/060502
PCT Pub. Date: Apr. 21, 2016

(65) Prior Publication Data
US 2017/0332300 A1    Nov. 16, 2017

Related U.S. Application Data

(60) Provisional application No. 62/063,968, filed on Oct. 15, 2014.

(51) Int. Cl.
*H04W 36/00*    (2009.01)
*H04W 36/18*    (2009.01)
(Continued)

(52) U.S. Cl.
CPC ........... *H04W 36/18* (2013.01); *H04W 36/30* (2013.01); *H04W 88/06* (2013.01)

(58) Field of Classification Search
CPC ........ H04W 12/08; H04W 88/08; H04L 47/28
(Continued)

(56) References Cited

U.S. PATENT DOCUMENTS

| | | | |
|---|---|---|---|
| 9,001,655 B2 * | 4/2015 | Watfa | H04W 48/06 370/235 |
| 2012/0243638 A1 * | 9/2012 | Maltsev | H04W 72/0453 375/316 |

(Continued)

FOREIGN PATENT DOCUMENTS

| | | |
|---|---|---|
| WO | WO 2013/012371 A1 | 1/2013 |
| WO | WO 2014/133313 A1 | 9/2014 |

*Primary Examiner* — Kiet Doan
(74) *Attorney, Agent, or Firm* — Birch, Stewart, Kolasch & Birch, LLP

(57) ABSTRACT

The present invention relates to a wireless access system supporting millimeter waves (mmWave) and provides methods for performing fast fallback so as to avoid link disconnections and devices for supporting same. The method whereby a legacy base station supports the fast fallback of a mmWave terminal in a wireless access system supporting millimeter waves (mmWave), according to one embodiment of the present invention, may comprise the steps of: receiving, from the mmWave terminal, a first fallback request message for requesting fast fallback; operating a fallback timer for determining whether or not to perform fallback after receiving the first fallback request message; and determining whether or not a second fallback request message for requesting fast fallback has been received from a mmWave base station within the fallback timer.

10 Claims, 21 Drawing Sheets

(51) Int. Cl.
*H04W 36/30* (2009.01)
*H04W 88/06* (2009.01)

(58) Field of Classification Search
USPC ... 455/442, 434, 91, 437, 433, 414.1, 456.1,
455/452.2, 114.2; 370/235, 312, 328,
370/331, 230
See application file for complete search history.

(56) References Cited

U.S. PATENT DOCUMENTS

| | | |
|---|---|---|
| 2013/0208698 A1* | 8/2013 | Taori .................... H04W 36/04 370/331 |
| 2014/0018079 A1 | 1/2014 | Xing et al. |
| 2014/0044046 A1 | 2/2014 | Vangala et al. |
| 2014/0293960 A1 | 10/2014 | Su et al. |

* cited by examiner

FIG. 6
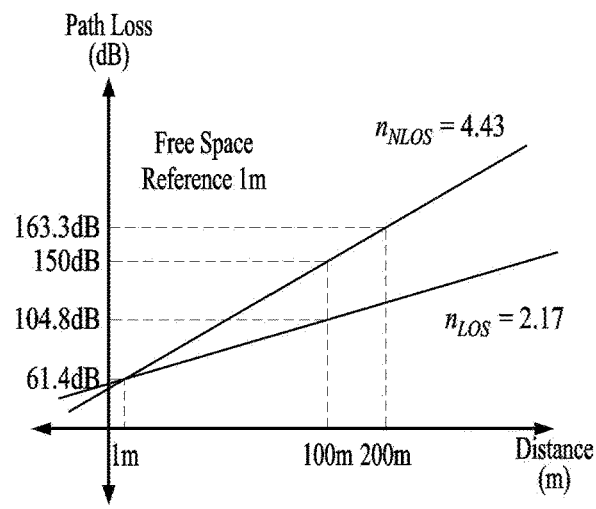
(a)
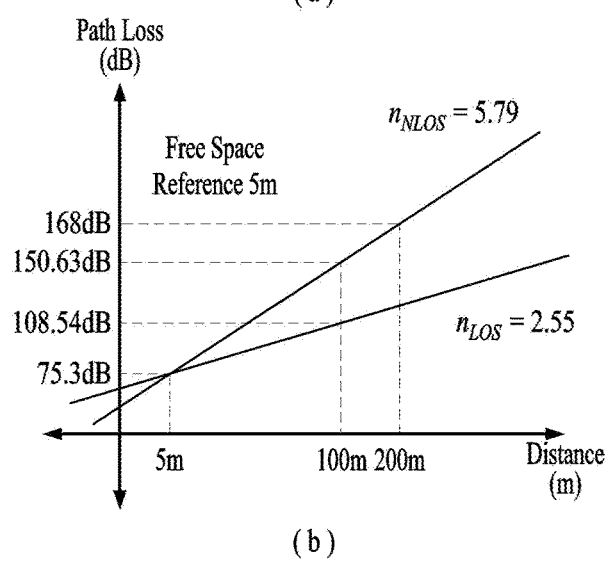
(b)
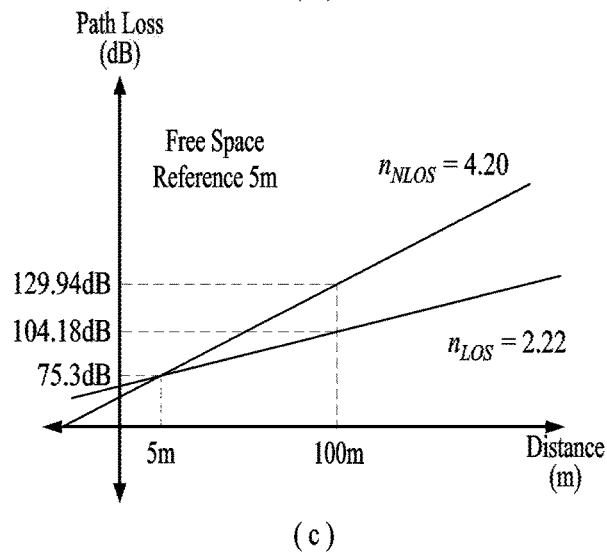
(c)

FIG. 8
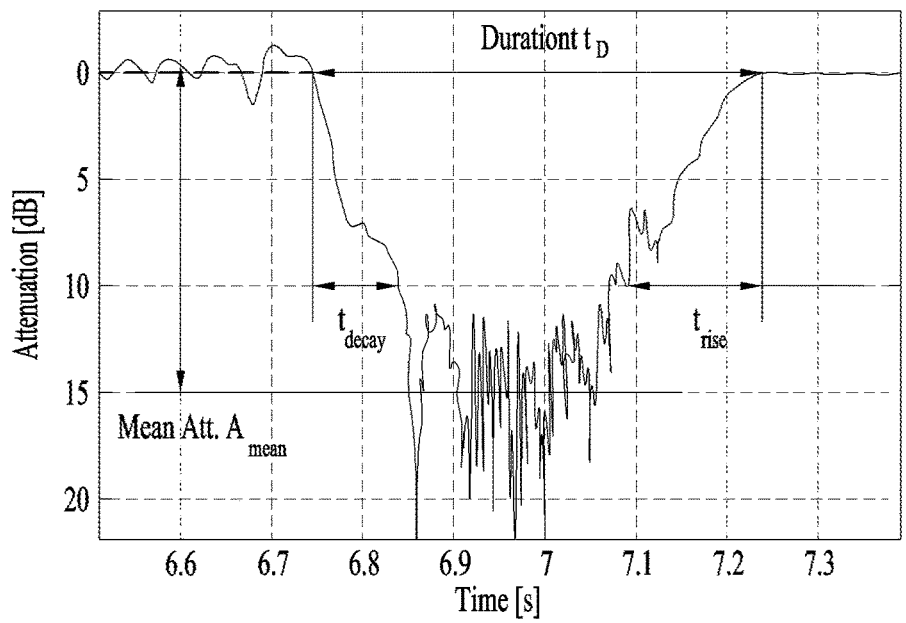
(a)
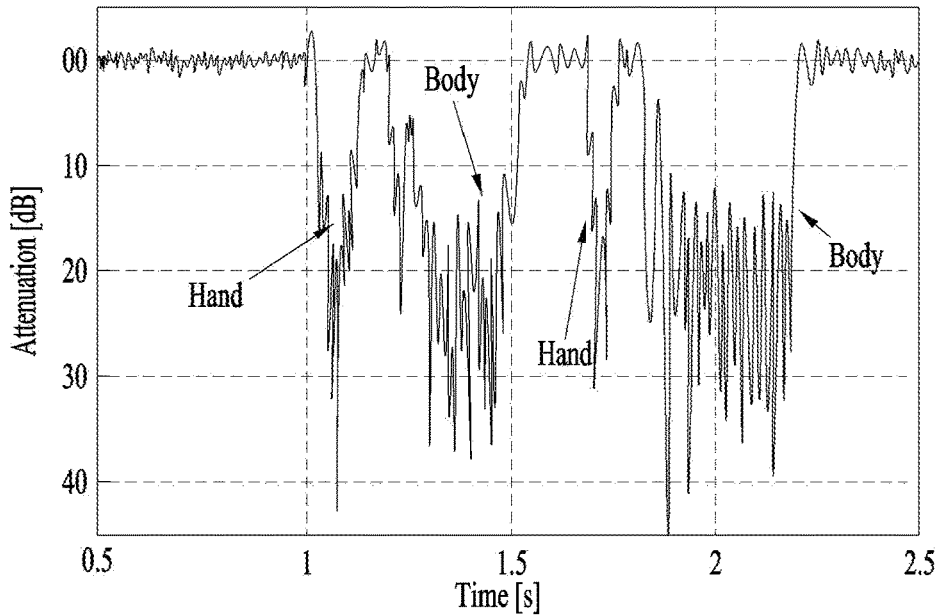
(b)

FIG. 13
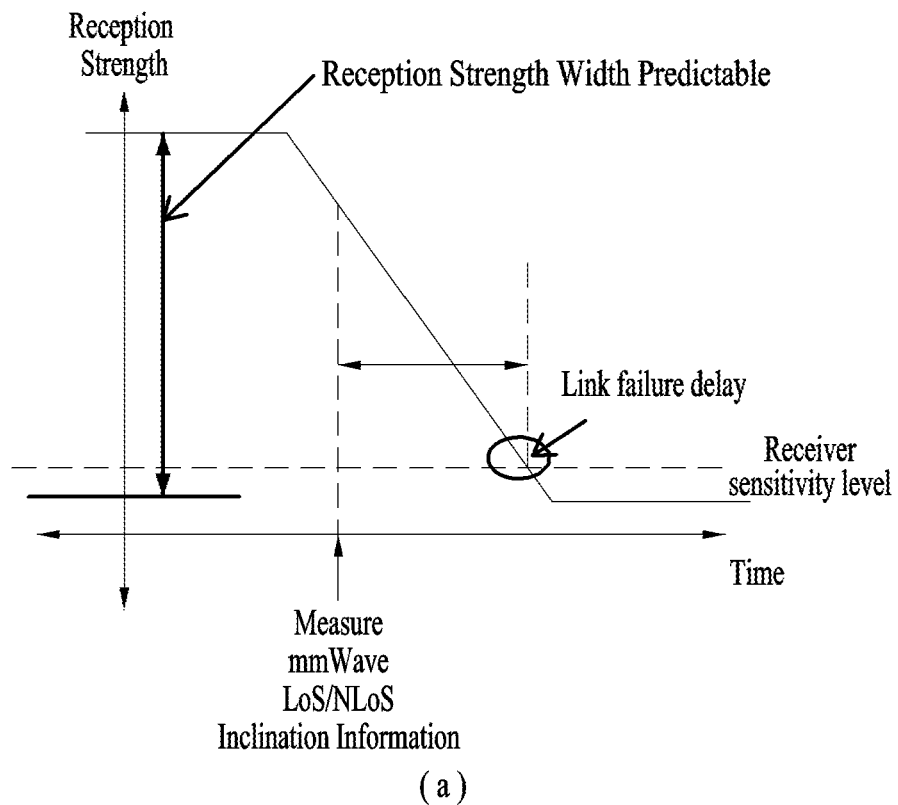
(a)
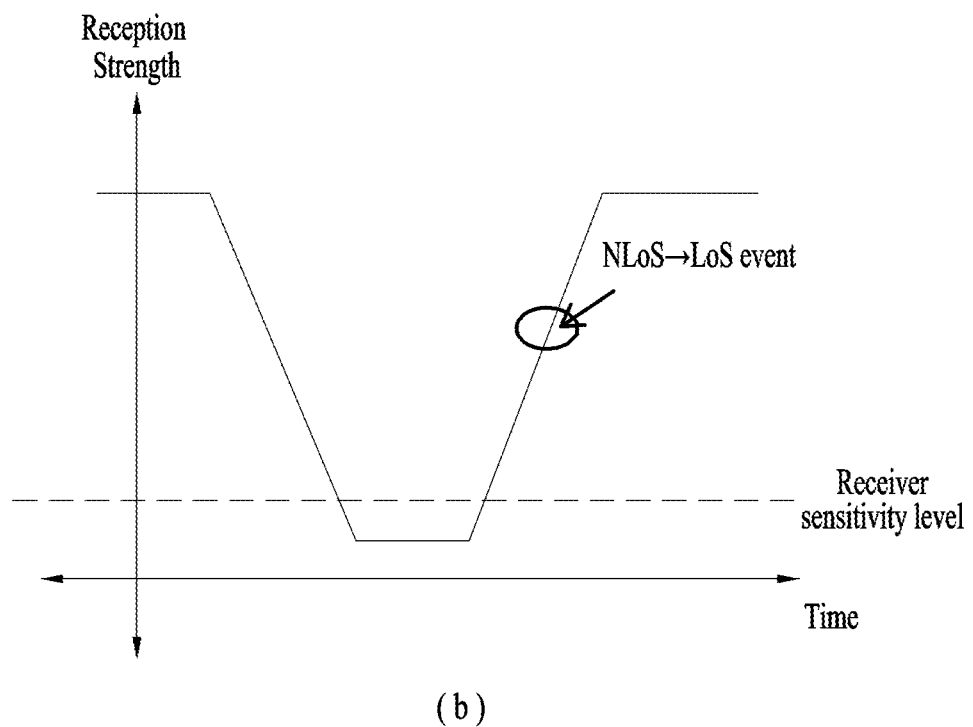
(b)

FIG. 14
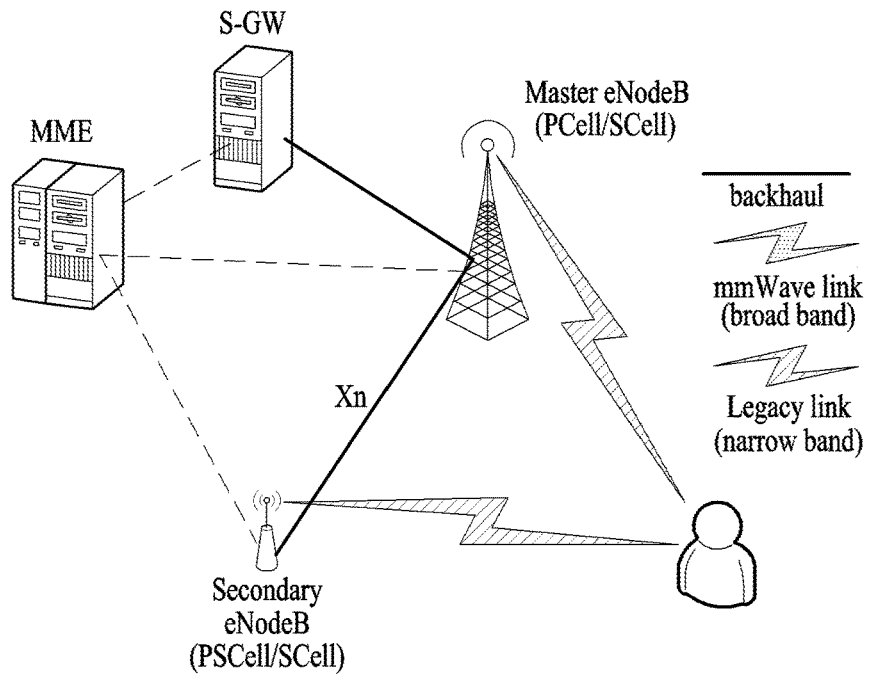
(a)
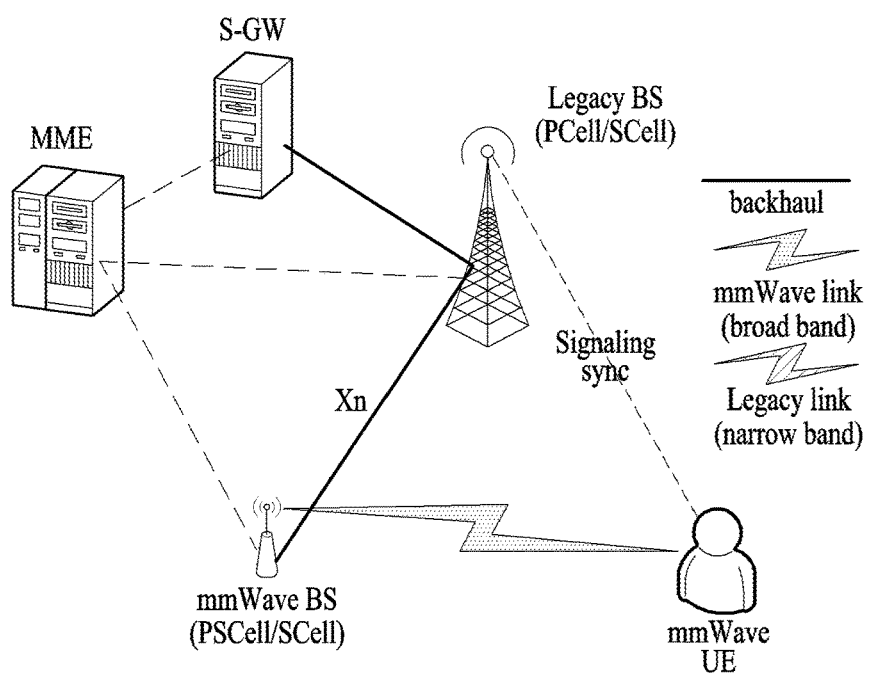
(b)

FIG. 15
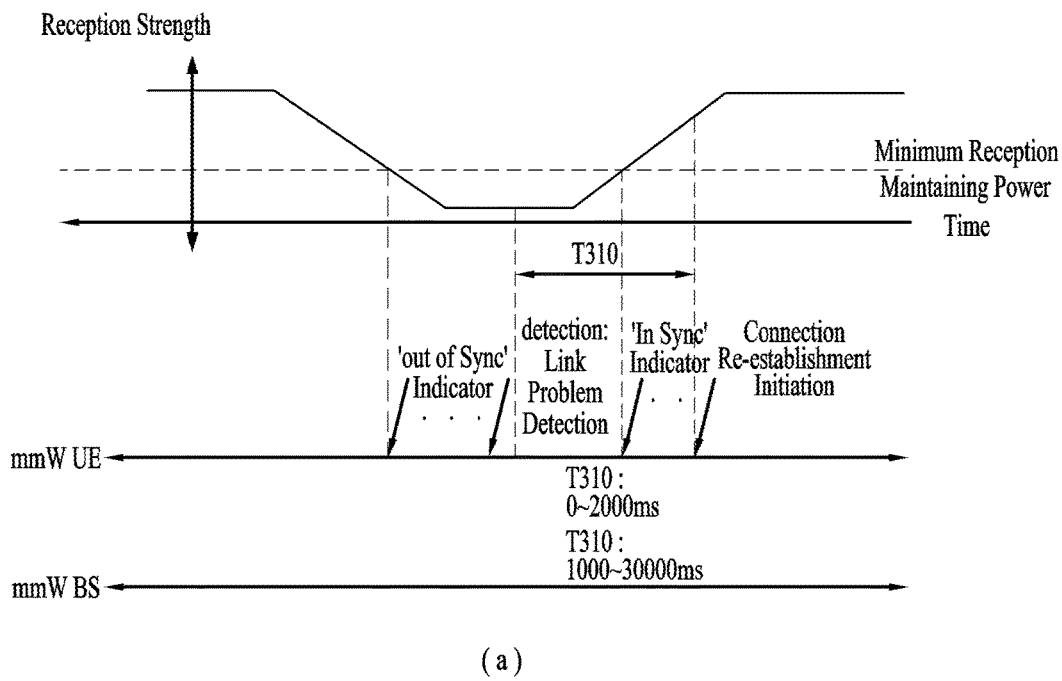
(a)
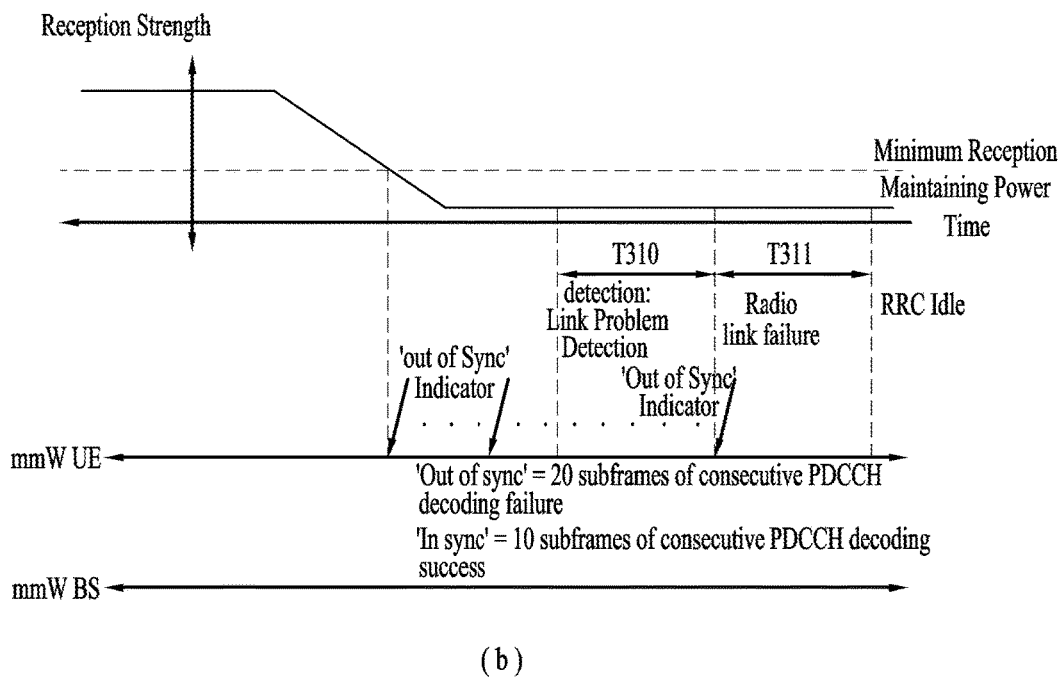
(b)

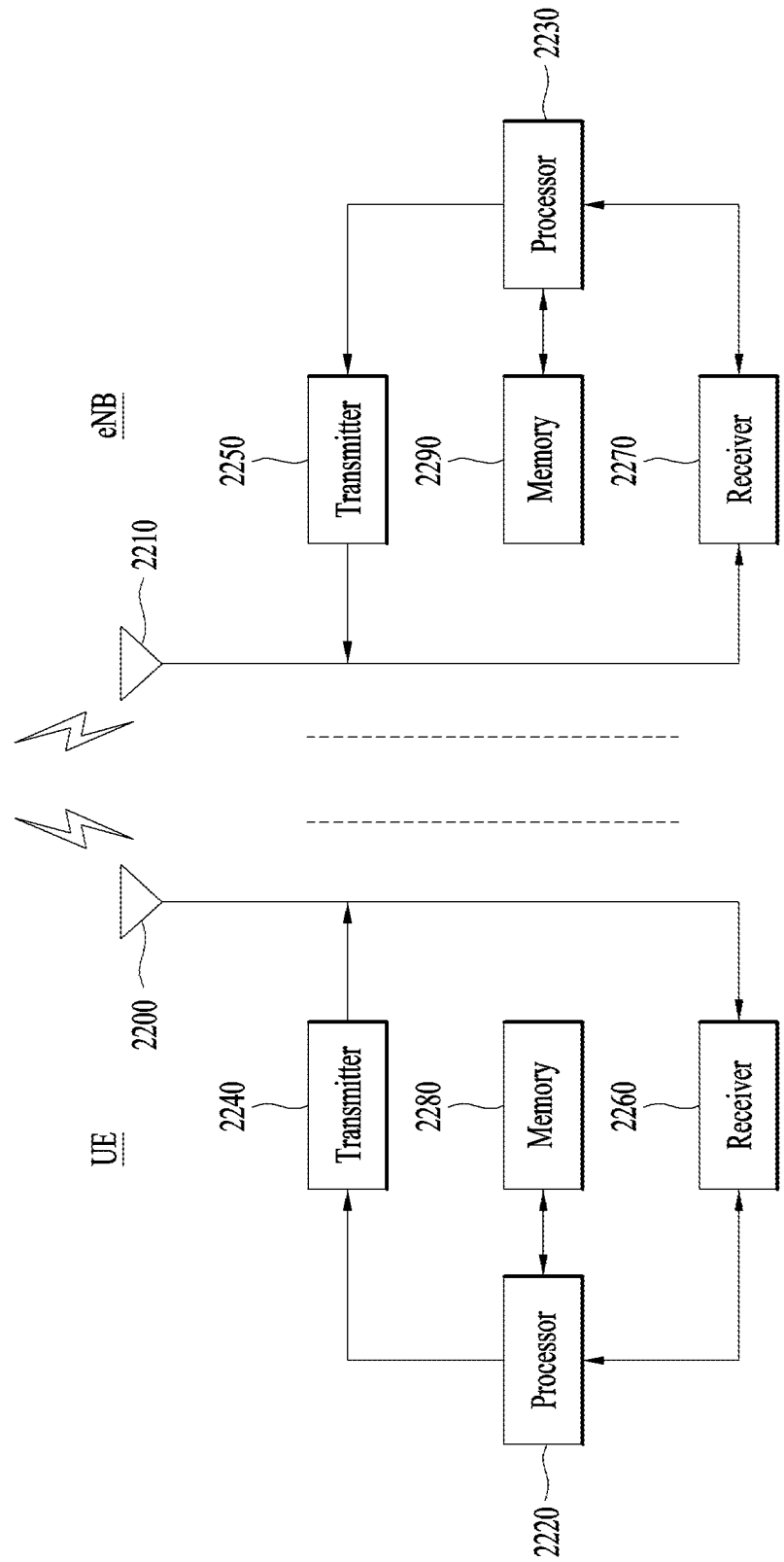

METHODS AND DEVICES FOR PERFORMING FAST FALLBACK IN WIRELESS ACCESS SYSTEM SUPPORTING MILLIMETER WAVES (MMWAVE)

CROSS REFERENCE TO RELATED APPLICATIONS

This application is the National Phase of PCT International Application No. PCT/KR2015/010920, filed on Oct. 15, 2015, which claims priority under 35 U.S.C. 119(e) to U.S. Provisional Application No. 62/063,968, filed on Oct. 15, 2014, all of which are hereby expressly incorporated by reference into the present application.

TECHNICAL FIELD

The present disclosure relates to a wireless access system supporting millimeter wave (mmWave), and more particularly, to methods and apparatuses for performing fast fallback to avoid a link failure.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency-division multiple access (SC-FDMA) system.

DISCLOSURE

Technical Problem

An aspect of the present disclosure devised to solve the conventional problem is to support efficient data communication in a millimeter (mmWave) system.

Another aspect of the present disclosure is to provide methods for performing a fast link recovery procedure before a link failure occurs due to a line of sight (LoS)/non-LoS (NLoS) transition in an mmWave system.

Another aspect of the present disclosure is to provide methods for performing fast fallback with support of a legacy system by an mmWave user equipment (UE).

Another aspect of the present disclosure is to provide a method for reducing errors generated during legacy fallback triggering and decreasing the load of channel measurement and reporting of an mmWave UE.

Another aspect of the present disclosure is to provide methods for performing adaptive fallback in consideration of fast return from NLoS to LoS.

Another aspect of the present disclosure is to provide an apparatus supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting millimeter wave (mmWave), and particularly, to methods and apparatuses for performing fast fallback to avoid a link failure.

In an aspect of the present disclosure, a method for supporting fast fallback of a millimeter wave (mmWave) user equipment (UE) by a legacy base station (BS) in a wireless access system supporting mmWave includes receiving, from the mmWave UE, a first fallback request message requesting fast fallback, activating a fallback timer to determine whether to perform fallback, after receiving the first fallback request message, and determining whether a second fallback request message requesting fast fallback has been received from an mmWave BS within a value of the fallback timer.

In another aspect of the present disclosure, a legacy BS for supporting fast fallback of an mmWave UE in a wireless access system supporting mmWave includes a transmitter, a receiver, and a processor operatively connected to the transmitter and the receiver and configured to support the fast fallback. The processor is configured to receive, from the mmWave UE, a first fallback request message requesting fast fallback by controlling the receiver, to activate a fallback timer to determine whether to perform fallback, after receiving the first fallback request message, and to determine whether a second fallback request message requesting fast fallback has been received from an mmWave BS within a value of the fallback timer.

The legacy BS may be configured to, upon receipt of the second fallback request message within the value of the fallback timer, transmit a fallback command message commanding fast fallback to the mmWave UE, and not to, upon expiration of the fallback timer, perform the fast fallback.

The fallback timer may be set in consideration of a line of sight (LoS)/non-LoS transition time allowed for an mmWave link, an NLoS state duration, an NLoS/LoS transition time, and a propagation delay and processing delay time of the legacy BS.

The mmWave UE may determine whether a LoS/NLoS transition has occurred based on a downlink reference signal (DL-RS) received from the mmWave BS.

The first fallback request message may also be transmitted to the mmWave BS.

After the mmWave UE measures whether a LoS/NLoS transition has occurred based on an uplink reference signal (UL-RS) transmitted to the mmWave BS, the second fallback request message may be transmitted.

The above-described aspects of the present disclosure are merely a part of preferred embodiments of the present disclosure, and those skilled in the art will derive and understand various embodiments reflecting technical features of the present disclosure from a detailed description of the present disclosure as set forth below.

Advantageous Effects

According to the embodiments of the present disclosure, the following effects are achieved.

First, downlink data can be transmitted continuously to a user equipment (UE) without a link failure, in spite of transition from a line of sight (LoS) state to a non-LoS (NLoS) state.

Secondly, compared to legacy fallback, a millimeter wave (mmWave) UE performs fast fallback, thus handling a link failure.

Thirdly, before occurrence of a LoS/NLoS transition causes a link failure, a link recovery procedure can be performed fast in an mmWave system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 6 is a view illustrating results of linear modeling of path loss with respect to distance;

FIG. 8 is a view illustrating human-incurred attenuation of mmWave signals;

FIG. 13 is a view illustrating a method for estimating a LoS/NLoS transition, that is, occurrence of NLoS by a UE;

FIG. 14 is a view illustrating inter-site carrier aggregation (CA) and an mmWave heterogeneous network (Hetnet) structure;

FIG. 15 is a view illustrating a link recovery procedure and a link failure procedure in a LoS/NLoS transition scenario;

FIG. 22 is a block diagram of apparatuses for implementing the methods illustrated in FIGS. 1 to 21.

BEST MODE FOR CARRYING OUT THE INVENTION

Figure 1:
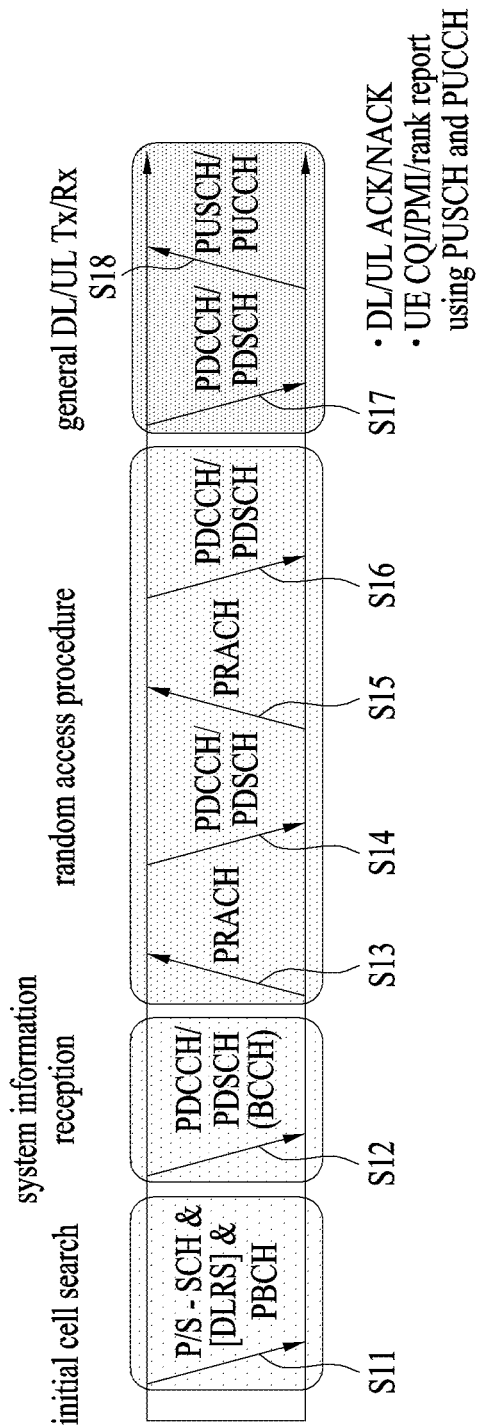
FIG. 1 is a view illustrating physical channels and a signal transmission method using the physical channels.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as fixed station, Node-B," eNode-B (eNB), advanced base station (ABS), and access point.

In the embodiments of the present disclosure, the term terminal may be replaced with a user equipment (UE), a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a transmission opportunity period (TxOP) is interchangeable with a Reserved Resource Period (RRP) in the same meaning. In addition, a listen before talk (LBT) process and a carrier sensing (CS) process for determining whether a channel state is in an idle state can be performed for the same purpose.

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3 GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs an initial cell search operation such as synchronization with an eNB (S11). To this end, the UE may receive a primary synchronization channel (P-SCH) and a secondary synchronization channel (S-SCH) from the eNB to perform synchronization with the eNB and acquire information such as a cell ID.

Then, the UE may receive a physical broadcast channel from the eNB to acquire broadcast information in the cell.

During the initial cell search operation, the UE may receive a downlink reference signal (DL-RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive PDCCH/PDSCH from the eNB (S17) and may transmit a physical uplink shared channel (PUSCH)/physical uplink control channel (PUCCH) to the eNB (S18), which is a general uplink/downlink signal transmission procedure.

Control information that the UE transmits to the eNB is commonly called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
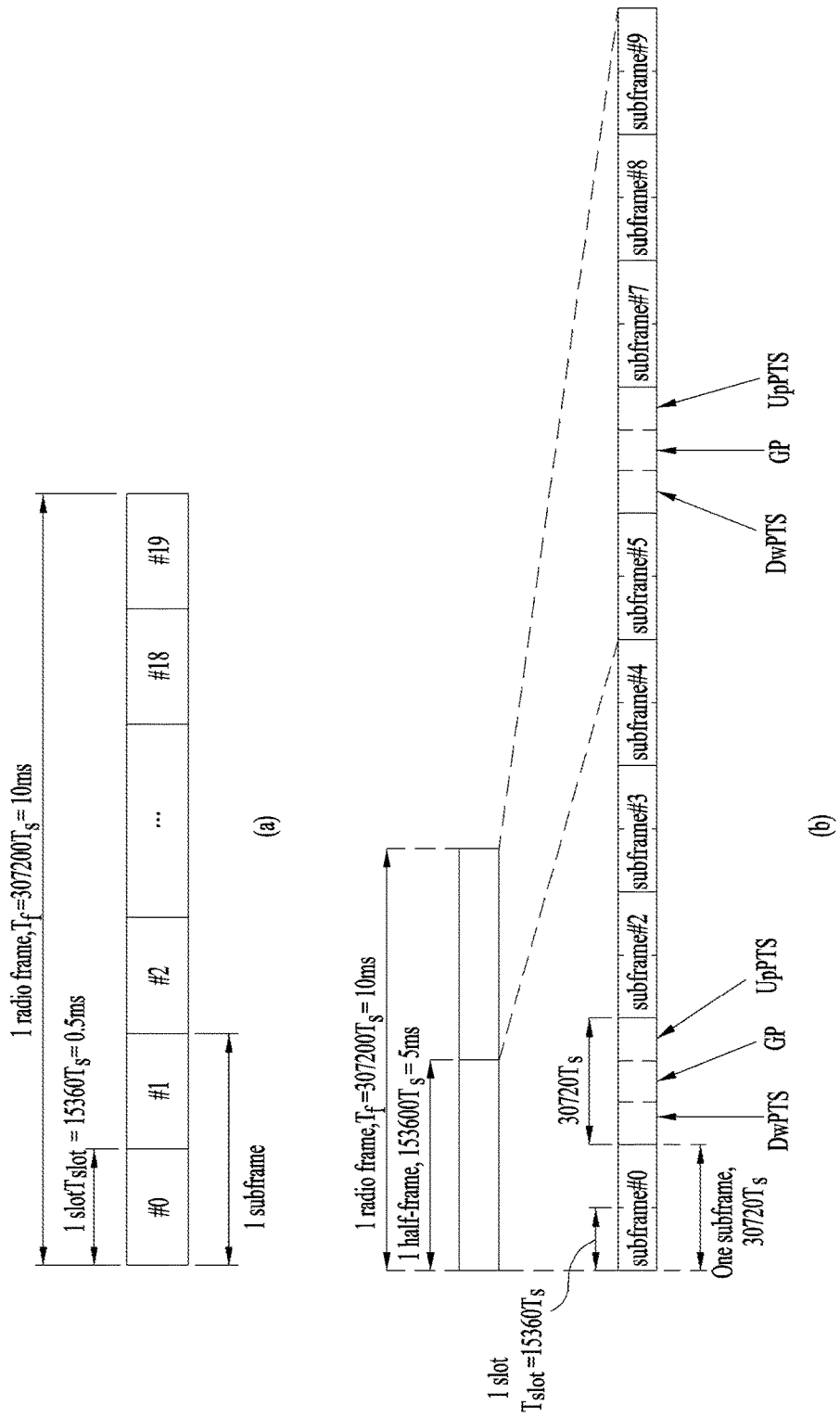
FIG. 2 is a view illustrating an exemplary radio frame structure.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a transmission time interval (TTI). Ts is a sampling time given as Ts=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
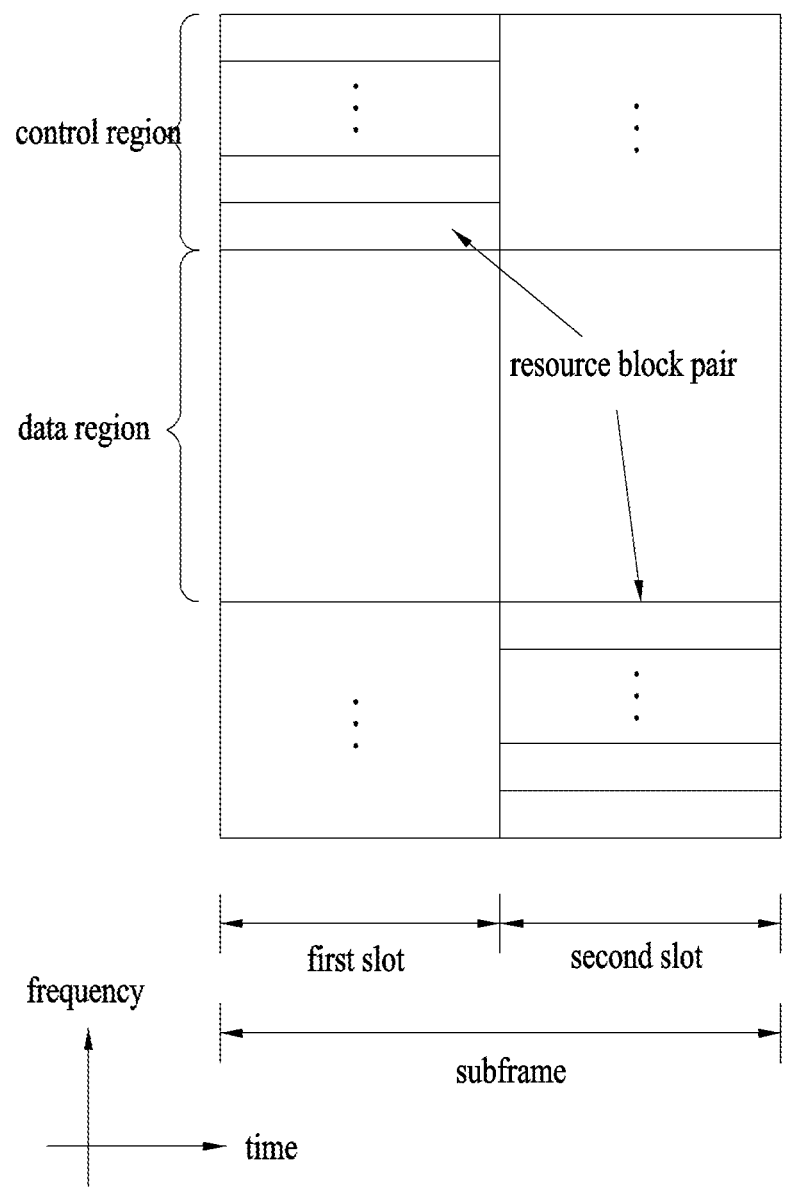
FIG. 4 is a view illustrating an exemplary structure of an uplink (UL) subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
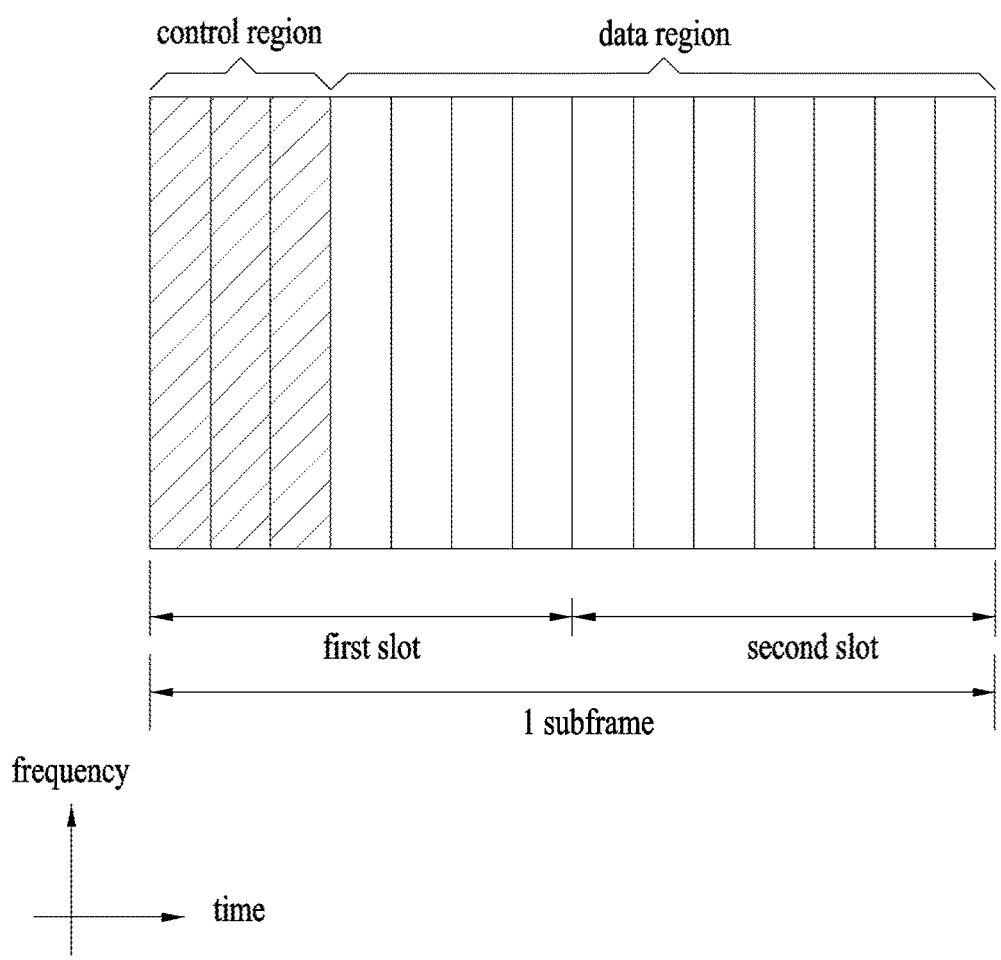
FIG. 5 is a view illustrating an exemplary structure of a DL subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called downlink control information (DCI). The DCI transports UL resource assignment information, DL resource assignment information, or UL transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · T | 2192 · T | 2560 · T | 7680 · T | 2192 · T | 2560 · T |
| 1 | 19760 · T | | | 20480 · T | | |
| 2 | 21952 · T | | | 23040 · T | | |
| 3 | 24144 · T | | | 25600 · T | | |
| 4 | 26336 · T | | | 7680 · T | | |
| 5 | 6592 · T | 4384 · T | 5120 · T | 20480 · T | 4384 · T | 5120 · T |
| 6 | 19760 · T | | | 23040 · T | | |
| 7 | 21952 · T | | | — | | |
| 8 | 24144 · T | | | — | | |

Figure 3:
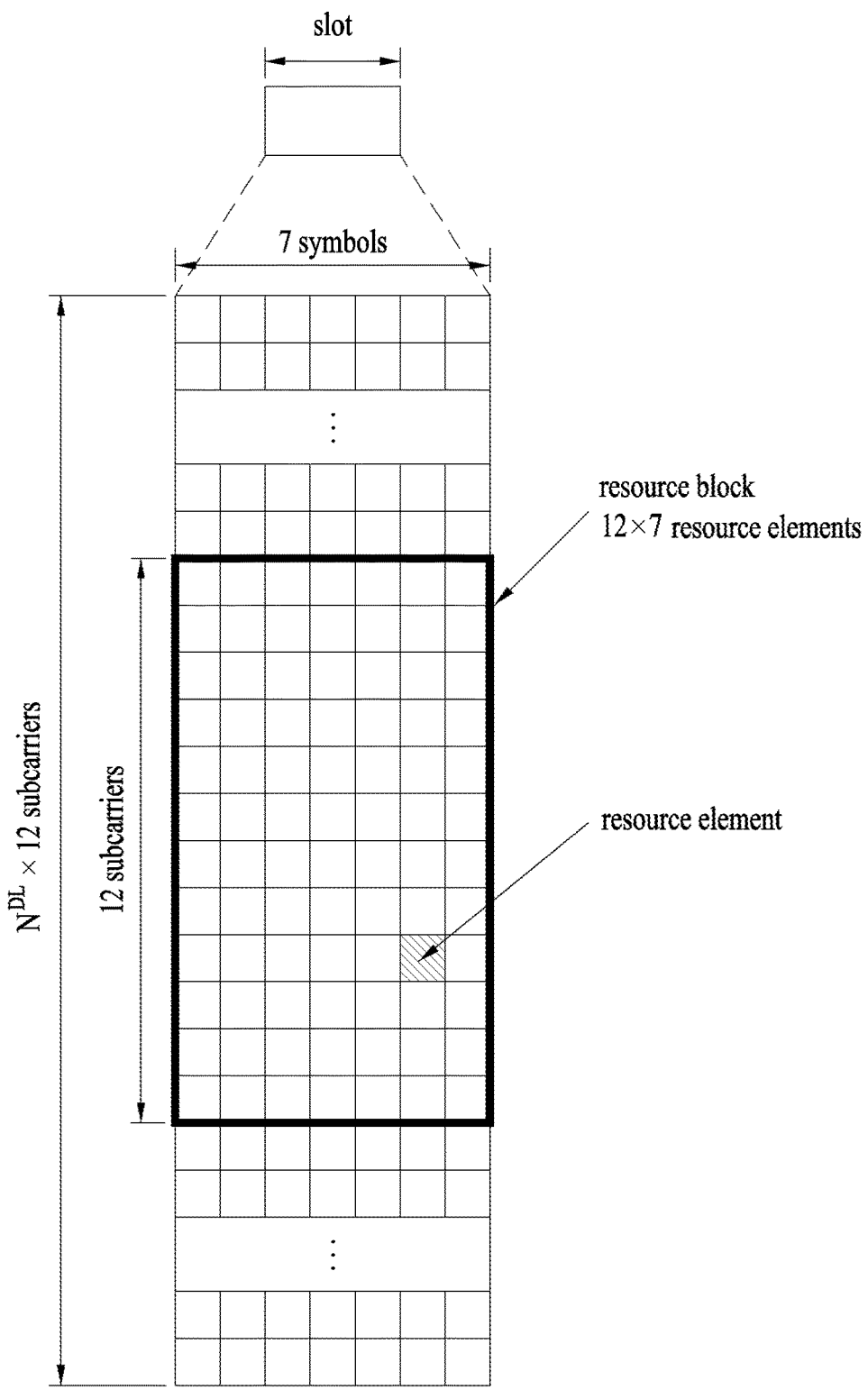
FIG. 3 is a view illustrating an exemplary resource grid for the duration of a downlink (DL) slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12

1.2 Physical Downlink Control Channel (PDCCH)

1.2.1 PDCCH Overview

The PDCCH may deliver information about resource allocation and a transport format for a downlink shared channel (DL-SCH) (i.e. a DL grant), information about resource allocation and a transport format for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive control channel elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the signal to interference plus noise ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing;
(4) Transmission mode 4: Closed-loop spatial multiplexing;
(5) Transmission mode 5: MU-MIMO;
(6) Transmission mode 6: Closed-loop, rank-1 precoding;
(7) Transmission mode 7: Precoding supporting a single layer transmission, which is not based on a codebook;
(8) Transmission mode 8: Precoding supporting up to two layers, which are not based on a codebook;
(9) Transmission mode 9: Precoding supporting up to eight layers, which are not based on a codebook; and
(10) Transmission mode 10: Precoding supporting up to eight layers, which are not based on a codebook, used for CoMP.

1.2.3 PDCCH Transmission

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a system information block (SIB), its CRC may be masked by a system information ID (e.g. a system information RNTI (SI-RNTI)). To indicate that the PDCCH carries a random access response to a random access preamble transmitted by a UE, its CRC may be masked by a random access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of search space (SS) is defined for blind decoding of a UE. An SS is a set of PDCCH candidates that a UE will monitor. The SS may have a different size for each PDCCH format. There are two types of SSs, common search space (CSS) and UE-specific/dedicated search space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH.

Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level L $\in \{1,2,4,8\}$. The CCEs of PDCCH candidate set m in the SS may be determined by the following equation.

$$L \cdot \{(Y_k+m) \bmod \lfloor HN_{CCE,k}/L \rfloor\} + i \qquad \text{[Equation 1]}$$

where $M^{(L)}$ is the number of PDCCH candidates with CCE aggregation level L to be monitored in the SS, m=0, ..., $M^{(L)}$-1, i is the index of a CCE in each PDCCH candidate, and i=0, ..., L-1·k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

In [Equation 2], $Y_{-1} = n_{RNTI} \neq 0$, $n_{RNTI}$ indicating an RNTI value. A=39827 and D=65537.

2. Millimeter Wave (mmWave)

2.1 Power Width Difference Between Line of Sight (LoS) and Non-LoS (NLoS)

FIG. 6 is a view illustrating results of linear modeling of path loss with respect to distance.

FIGS. 6(a), 6(b), and 6(c) illustrate results of linear modeling measured in different areas, revealing that different propagation loss constants for a 28-GHz band are derived.

FIG. 6(a) is based on the assumption that for 100 m between a transmitter and a receiver, path losses are set to 104.8 dB and 150 dB respectively for a LoS channel and an NLoS channel, in consideration of reflection loss, rotation loss, penetration loss, and so on, and propagation loss constants for LoS and NLoS are calculated to be 2.17 and 4.43, respectively by applying linear filtering in consideration of a path loss offset of 61.4 dB in 28 GHz for a reference distance of 1 m.

FIGS. 6(a) and 6(c) are identical to FIG. 6(a) except that path loss offsets are considered for a reference distance of 5 m. For example, FIG. 6(c) is for a path loss model in which buildings are apart from each other by about 30 m, there are three or four campus buildings, and the building density may be classified as a suburban level in terms of path loss environment. On the other hand, the path loss model of FIG. 6(a) is based on the results of a simulation performed on a Manhattan street grid model by Ray tracking, close to the path loss model of FIG. 6(b) in terms of calculation of a path loss within 100 m.

That is, although NLoS propagation loss constants are different, 4.43 and 5.76 in FIGS. 6(a) and 6(b), considering that a reference distance for attenuation is set to 1 m in FIGS. 6(a) and 5 m in FIG. 6(b), FIGS. 6(a) and 6(b) are similar in terms of path loss calculation results within 100 m, compared to FIG. 6(c).

Based on this feature, it is assumed that a LoS/NLoS path loss model for 28 GHz mmWave transmission in an urban outdoor environment is adopted as a path loss model in embodiments of the present disclosure. The results of this modeling reveal that for 100 m, a path loss difference in 28 GHz mmWave transmission between an NLoS channel environment and a LoS channel environment is 45.2 dB.

For any distance, a path loss value may be calculated by applying a propagation loss constant n derived from the results of the above path loss modeling, according to [Equation 3].

[Equation 3]

$$PL(d) = PL_{free}(d_0) + 10n\log\left(\frac{d}{d_0}\right)$$

In [Equation 3], PL( ) represents a path loss function, d represents the distance between a transmitter and a receiver, and $d_0$ represents a reference distance.

2.2 Characteristics of LoS and NLoS

An mmWave signal is very sensitive to shadowing. For example, an mmWave signal may experience a signal attenuation of 40 to 80 dB due to an obstacle such as a wall, and a signal attenuation of 20 to 35 dB due to a human body itself. Moreover, a human body and many external materials may cause a very serious propagation delay to the mmWave signal.

Figure 7:
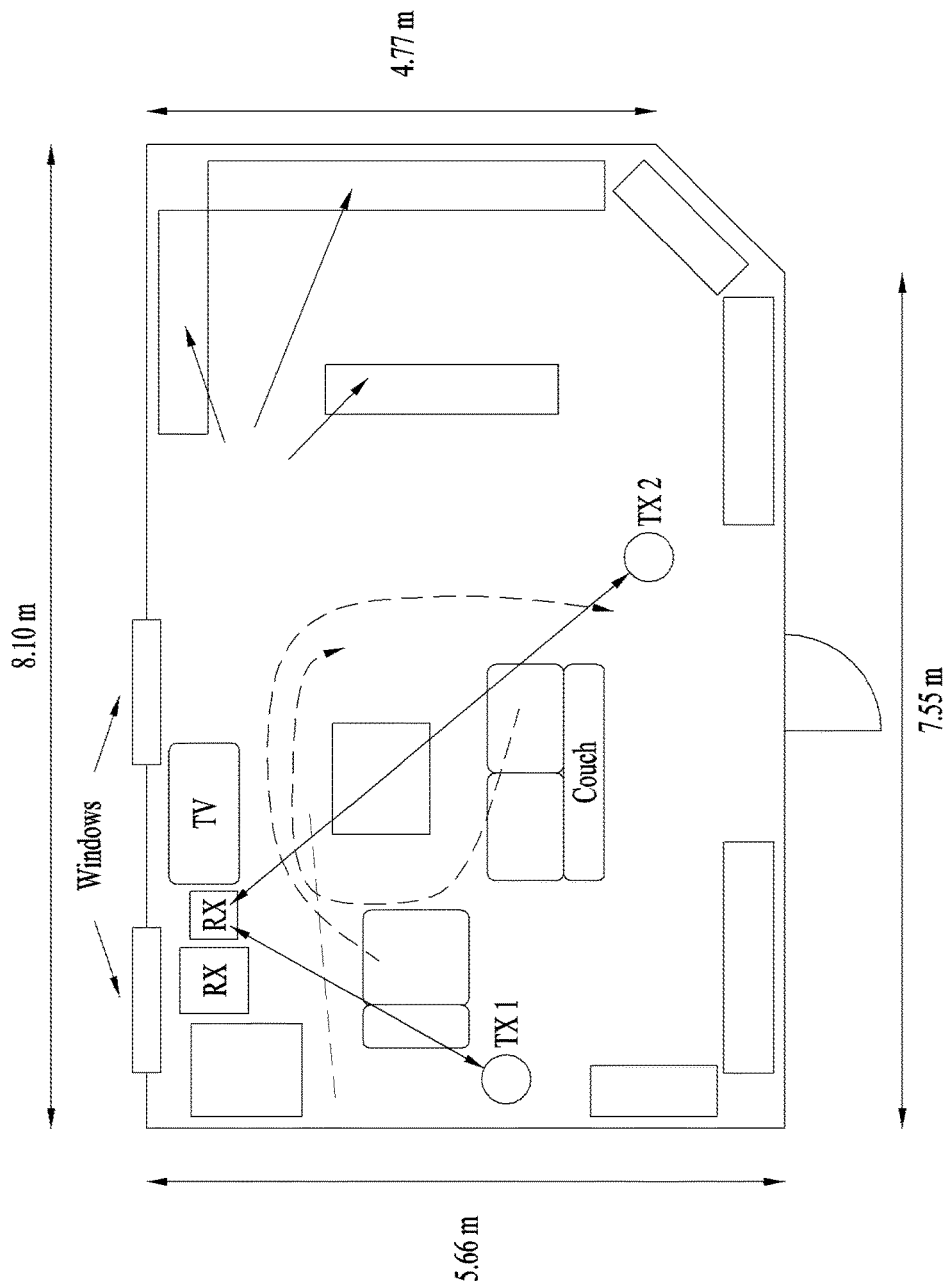
FIG. 7 is a view illustrating transmissions of millimeter wave (mmWave) signals indoors.

FIG. 7 is a view illustrating transmissions of mmWave signals indoors, and FIG. 8 is a view illustrating human-incurred attenuation of mmWave signals.

In general, a person runs at about 14.4 km/h and walks at 4.8 km/h, and it is assumed that a sprinter runs at an average speed of about 10 m/s. Results illustrated in FIG. 8 may be achieved by measuring the propagation losses of mmWave signals based on this information in an indoor environment illustrated in FIG. 7. The following measurement parameters are given to measure the propagation losses of mmWave signals.

(1) Agilent E8361A vector network analyzer
(2) Vertical polarized circular horn antennas: 20 dBi
(3) Half beamwidth: 10 degree FIG. 8(a) illustrates measurements of mmWave signals in a LoS environment without any obstacle, and FIG. 8(b) illustrates measurements of mmWave signals in an NLoS environment in which propagation loss is caused by a human body. Referring to FIG. 8, a LoS/NLoS power loss difference is about 15 dB within 5 m. In a 28-GHz band, the LoS/NLoS power loss difference may be about 43 dB for a distance of 100 m.

In FIGS. 7 and 8, a LoS/NLoS transition time caused by a person moving at 0.6 m/s is about 150 ms. Therefore, a change in the LoS/NLoS transition time of an object moving at 0.6 m/s may be expressed as 9 ms (=(0.6×0.15)/10). This transition time change may be shorter upon occurrence of a swift hand swing or in any other special event. Since the LoS/NLoS transition time period is caused by a UE's movement and an environmental change, it is very difficult to predict a LoS/NLoS change.

Figure 9:
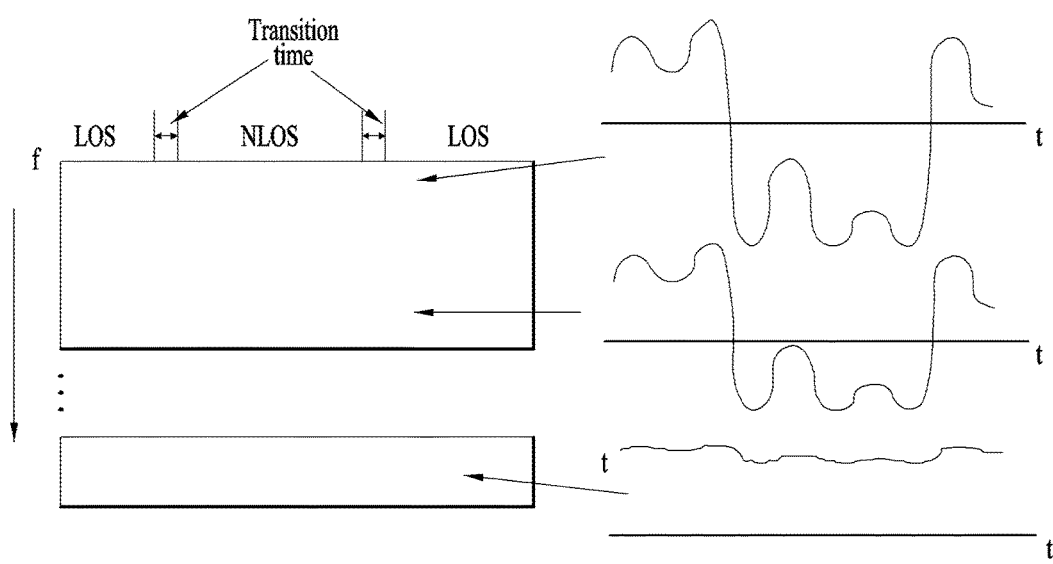
FIG. 9 is a view illustrating a relationship between variations in line of sight (LoS)/non-LoS (NLoS) transition time and received power according to frequencies.

FIG. 9 is a view illustrating a relationship between variations in LoS/NLoS transition time and received power according to frequencies. In FIG. 9, the horizontal axis represents time, and the vertical axis represents frequency.

Referring to FIG. 9, a LoS/NLoS transition time changes very rapidly in a high-frequency environment, and its change rate gets low in a low-frequency environment.

As illustrated in FIG. 9, a power attenuation or increase time during transition between LoS and NLoS is dependent on how LoS is transitioned to NLoS. During a LoS/NLoS transition, a received signal attenuation width increases in high frequency, where the received signal attenuation width is small or almost nothing low frequency. An instantaneous power decrease inclination at any time t is almost close between adjacent bands.

As described before, the mmWave system is highly likely to operate in an ultra-high frequency band. That is, the LoS/NLoS transition for an mmWave signal may be very sensitive to an external environment.

Figure 10:
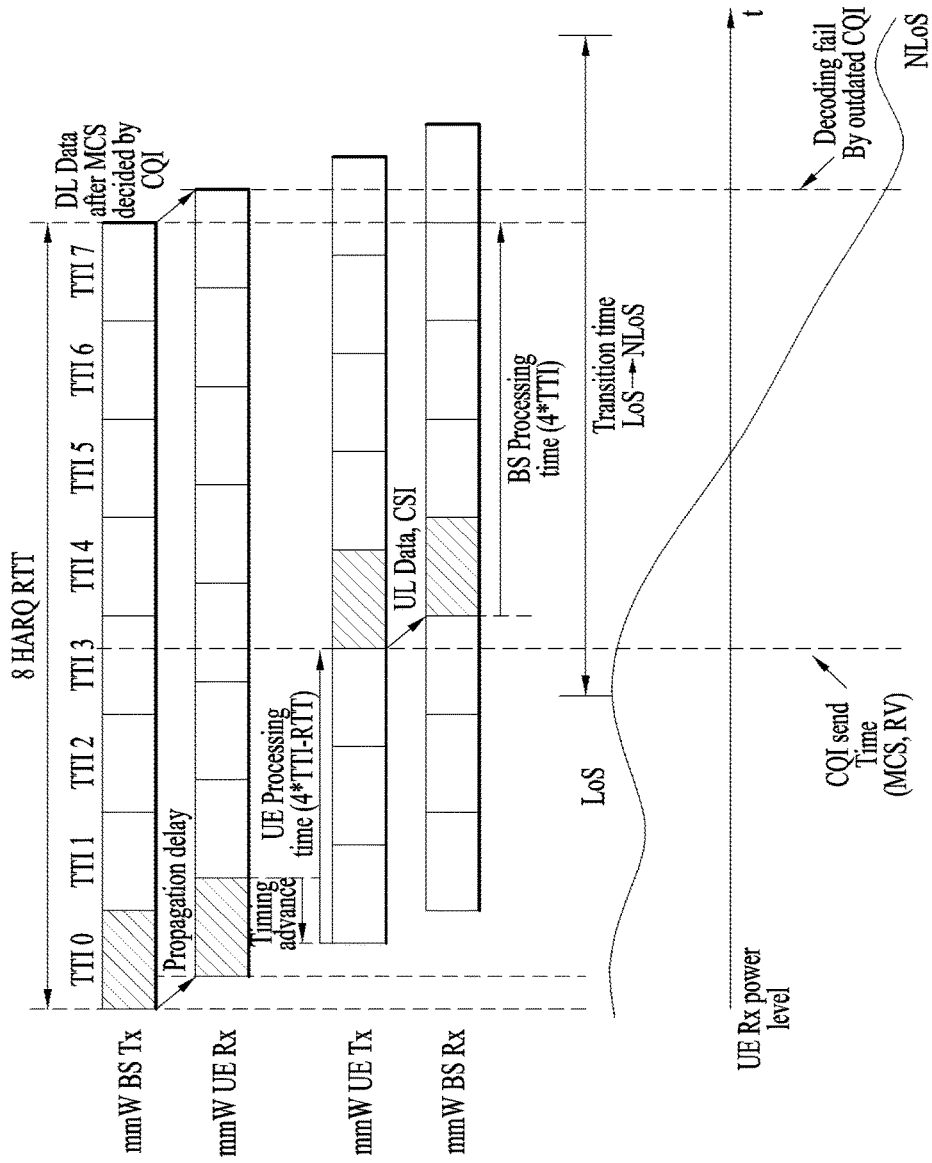
FIG. 10 is a view illustrating that a signal detection failure may occur during an operation based on a previous channel quality indicator (CQI) feedback due to a variation in a received mmWave DL signal.

FIG. 10 is a view illustrating that a signal detection failure may occur during an operation based on a previous CQI feedback due to a variation in a received mmWave DL signal.

FIG. 10 illustrates a procedure of decoding channel information acquired from a CQI by an 8HARQ procedure, and determining information such as a DCI format, an MCS, and a redundancy version (RV) based on the channel information. Upon occurrence of a LoS/NLoS transition on an mmWave link, it may be observed that CQI information is outdated.

In the case where a DL transmission starts 4 TTIs (4 ms in LTE) later, if a LoS/NLoS transition occurs, a latest detected CQI is highly likely to have wrong channel information in view of the nature of mmWave when LoS is changed to NLoS in a legacy system. Therefore, a BS transmits scheduling information such as a wrong MCS and RV to a UE, thereby increasing the probability of a signal detection failure and degrading throughput performance in the system.

The simplest solution to an mmWave DL channel change is that a UE is configured to transmit a CQI feedback more frequently. In an FDD LTE system, the shortest CQI reporting period is two subframes. However, the frequent CQI reporting may impose a constraint (requiring fast processing) in terms of cost efficiency for decoding a received CQI in a BS. Further, as a LoS/NLoS transition occurs again during a time required for receiving and decoding a CQI feedback at the BS, a new received CQI may also become obsolete. Moreover, a CQI is an indicator that feeds back SINR-based information, and thus the CQI received by the BS already includes information about interference of a received signal.

Therefore, to identify a LoS/NLoS transition, a UE and/or a BS preferably determines the LoS/NLoS transition based on a received power-based measurement at a corresponding time instant. The received power-based channel information may be transmitted by measuring and feeding back the reference signal received power (RSRP) of a downlink reference signal (DL-RS) by the UE. However, RSRP is preferred for long-term channel measurement because a maximum allowed time for RSRP measurement of the UE is 20 ms, too long from the viewpoint of the mmWave system. That is, since a LoS/NLoS transition should be determined from the perspective of short-term channel measurement, it is difficult to detect a LoS/NLoS transition and control an MCS or the like accordingly by a legacy channel state reporting method in the mmWave system.

2.3 mmWave LoS/NLoS Transition and Received Power Scenarios

Figure 11:
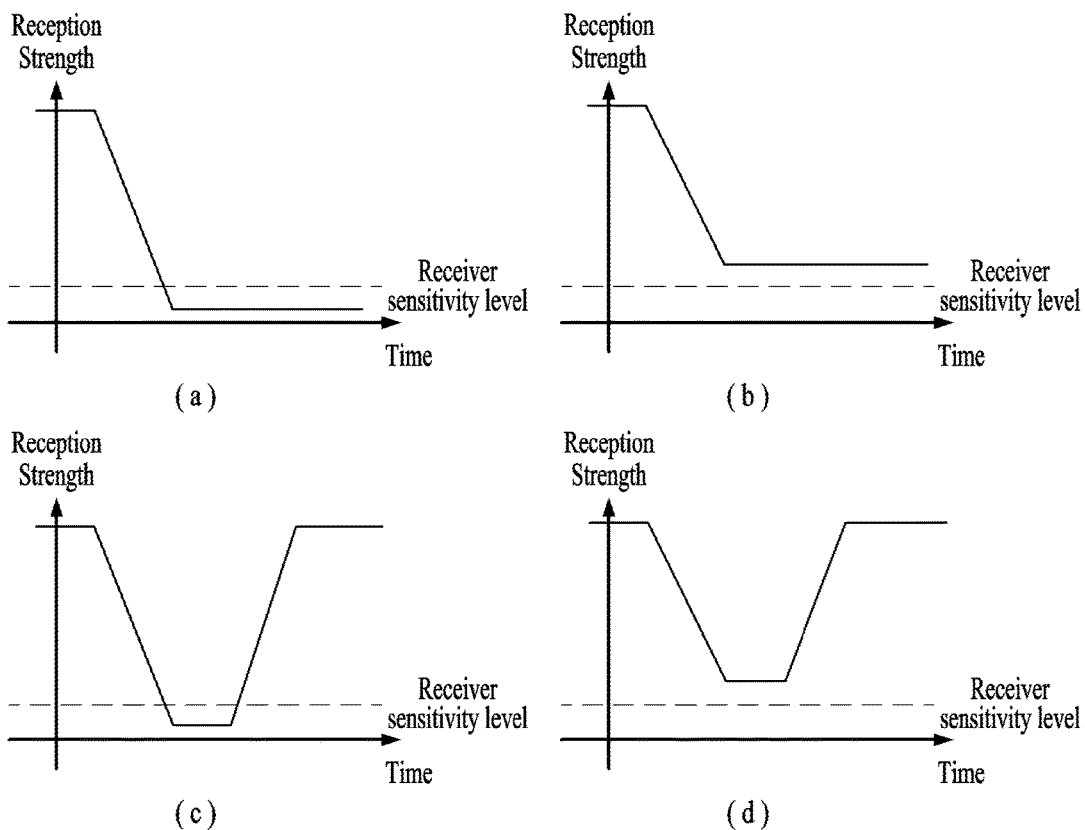
FIG. 11 is a view illustrating received power scenarios, for describing influence of an mmWave LoS/NLoS transition on a link environment.

FIG. 11 is a view illustrating received power scenarios, for describing influence of an mmWave LoS/NLoS transition on a link environment.

In FIG. 11, the vertical axis represents received power levels, and the horizontal axis represents time units. A minimum received power level (i.e., a receiver sensitivity level (RSL)) means a minimum received power value at which a receiver is capable of receiving data. In other words, even though LoS changes to NLoS, the receiver may receive data at or above the RSL normally.

Based on this assumption, referring to FIG. 11(*a*), NLoS received power is lower than the RSL, and an NLoS duration is long. In the illustrated case of FIG. 11(*b*), the NLoS received power is higher than the RSL, and the NLoS duration is long. In the illustrated case of FIG. 11(*c*), the NLoS received power is lower than the RSL, and the NLoS duration is short. In the illustrated case of FIG. 11(*d*), the NLoS received power is higher than the RSL, and the NLoS duration is short.

For effective fallback, the receiver preferably considers a different mmWave fallback method for each scenario illustrated in FIG. 11. For example, the received power scenario of FIG. 11(*a*) is for an environment in which the received power is decreased to below the RSL, and the NLoS state lasts. Therefore, if a link is failed, the receiver should perform a radio link failure procedure rapidly. If the link of the receiver is still failed in spite of two link recovery phases as in a legacy radio link failure procedure illustrated in FIG. 12, the receiver enters an idle state. Since the link recovery including the two phases takes at least 1000 ms, if the link is kept failed, the amounts of received and transmitted data decrease rapidly. Accordingly, it is preferred that the receiver performs fast fallback before a link failure in the illustrated case of FIG. 11(*a*).

Figure 12:
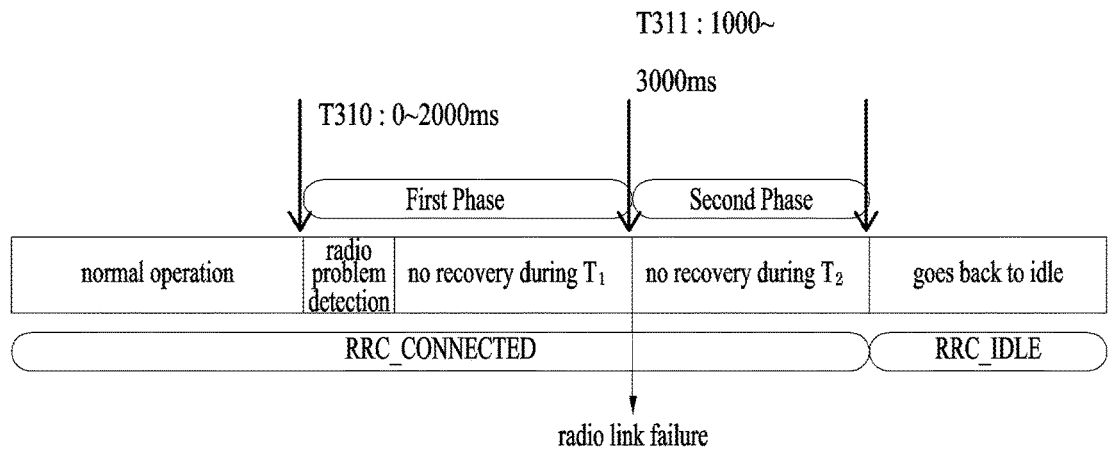
FIG. 12 is a view illustrating an exemplary radio link failure procedure.

FIG. 12 is a view illustrating an exemplary radio link failure procedure. Referring to FIG. 12, the receiver may sense occurrence of a problem to a radio link during a normal operation. Then, the receiver performs a link recovery procedure in a first phase. Herein, the receiver may activate a recovery timer T310, taking 0 to 2000 ms. If the link is not recovered during the time of the T310 timer, the receiver enters a second phase and activates a recovery timer T311. The T311 timer may be set to up to 1000 ms. If the link is recovered within the time periods of the T310 and T311 timers, the receiver communicates again with the transmitter. On the other hand, if the link is not recovered even after the second phase, the receiver enters an idle state. For more details of FIG. 12, refer to 3GPP TS 36.300.

Referring to FIG. 11 again, even though the receiver performs the legacy fallback procedure (it is assumed in the embodiments of the present disclosure that the fallback procedure is similar to handover), the link is kept connected to the transmitter and thus there is no problem in FIGS. 11(*b*) and 11(*d*).

In the scenario of FIG. 11(c), however, if a time spanning from fallback triggering to fallback completion of the receiver is shorter than a time spanning from measurement of a LoS/NLoS transition to return to LoS, fallback is favorable. However, in the opposite case (i.e., the NLoS period is short), it is preferred in terms of data throughput of the receiver not to perform fallback. Accordingly, to fulfill fallback conditions in each scenario, the receiver preferably estimates and predicts each received power scenario in advance.

2.4 Received Power Estimation Scenario According to mmWave LoS/NLoS Transition For the receiver (e.g., a UE) to distinguish the situations of FIGS. 11(a) and 11(b) from each other when LoS changes to NLoS, it is important to predict and estimate the time of a link failure.

FIG. 13 is a view illustrating a method for estimating a LoS/NLoS transition, that is, occurrence of NLoS by a UE.

At the moment a link failure occurs, the UE may estimate a LoS/NLoS transition, as illustrated in FIG. 13(a). In FIG. 13(a), upon occurrence of a LoS/NLoS transition, the UE may estimate mmWave LoS/NLoS inclination information (refer to Application No. PCT/KR2015/006716), measure the distance between the UE and an mmWave BS using a pilot in LoS, and estimate reception strength widths of LoS and NLoS through transmission frequency information, thereby estimating the time of a link failure.

Further, it is preferred that the UE also predicts and estimates return from NLoS to LoS in the scenario of FIG. 11(c), as illustrated in FIG. 13(b). This is because when an NLoS power level is lower than an RSL, whether to trigger fallback depends on how long the NLoS power level lasts.

As illustrated in FIG. 13(b), the time duration of a LoS→NLoS→LoS transition is sensitive to a movement pattern unique to an mmWave UE. Therefore, the UE cannot help estimating whether a LoS/NLoS transition has occurred, probabilistically and empirically based on its movement pattern information. The probabilistic estimation of the UE may cause an error in NLoS estimation.

In this context, the following embodiments of the present disclosure provide fallback methods for a received power scenario with a link failure and a received power scenario without a link failure, except for a received power scenario with NLoS/LoS return.

2.5 Inter-Site CA and mmWave Hetnet

FIG. 14 is a view illustrating inter-site carrier aggregation (CA) and an mmWave heterogeneous network (Hetnet) structure.

FIG. 14(a) illustrates the basic structure of inter-site CA. It is assumed that each of a master eNode B (MeNB) and a second eNode B (SeNB) has a primary cell (PCell) and a secondary cell (SCell) for CA. The SeNB may also have a PSCell for independent signaling. A wired or wireless Xn interface exists as a backhaul between the MeNB and the SeNB, and enables direct exchange of information and data between the MeNB and the SeNB. In FIG. 14(a), it may be assumed that an mmWave UE is connected to the MeNB and the SeNB via legacy links.

FIG. 14(b) illustrates a case in which a legacy BS serves as an MeNB and an mmWave BS serves as an SeNB in an mmWave Hetnet structure. Due to a great transmission rate difference between a legacy link and an mmWave link, the amount of mmWave data and control information may be very different from that of legacy data and control information. Accordingly, a legacy BS link and an mmWave BS link are preferably controlled independently.

However, since the mmWave link is less stable than the legacy link (for a reason such as a LoS/NLoS transition), it is preferred that an mmWave UE is prepared for linked control of the legacy BS, such as fallback to the legacy link. Therefore, the legacy BS preferably maintains a control channel with the mmWave UE in a connected state so that the legacy BS may exchange required information for fallback of the mmWave link and resource scheduling with the mmWave UE.

3. Fast Fallback Method

The following embodiments of the present disclosure provide methods for triggering an mmWave DL LoS/NLoS transition to a legacy BS by an mmWave UE and an mmWave BS, for fast fallback. Further, the embodiments of the present disclosure relate to methods for reducing errors generated during legacy fallback triggering and decreasing the channel measurement and reporting load of an mmWave UE.

FIG. 15 is a view illustrating a link recovery procedure and a link failure procedure in a LoS/NLoS transition scenario.

FIG. 15(a) illustrates a link recovery procedure in a scenario in which an mmWave DL transitions from LoS to NLoS and then returns to LoS. In FIG. 15(a), the link recovery procedure described with reference to FIG. 12 is applied to the situation described with reference to FIG. 13(b).

Referring to FIG. 15(a), if an SNR level is decreased too much to maintain a link, an mmWave UE should transmit an 'out of sync' message to a higher layer. This operation is performed each time the mmWave UE fails in PDCCH decoding in consecutive DL subframes (e.g., 20 subframes). Similarly, each time the mmWave UE succeeds in PDCCH decoding in 10 subframes, the mmWave UE transmits an 'in sync' message to the higher layer.

However, since this procedure causes much load when the mmWave UE measures and reports the channel state of an mmWave DL, periodic transmission at each time is not preferable. Moreover, it takes a relatively long time for the mmWave UE to determine that a link is failed.

FIG. 15(b) illustrates a link failure procedure in the case where an NLoS state lasts long. In FIG. 15(b), the link failure procedure described with reference to FIG. 12 is applied to the situation described with reference to FIG. 13(a).

Referring to FIG. 15(b), upon generation of an 'out of sync' message n times, the mmWave UE activates a T310 timer and at the same time, performs a link recovery procedure, determining that the mmWave DL is defective. Upon expiration of the T310 timer, the UE activate a T311 timer and, at the same time, performs the radio link recovery procedure again, determining a radio link failure. Upon expiration of the T311 timer without radio link recovery, the UE transitions to an RRC idle state.

If a link is unstable due to a sudden LoS/NLoS transition and long lasting NLoS, it takes a long time to determine whether to perform fallback to a legacy BS and to transmit a fallback request in the radio link recovery/failure procedure described in FIG. 15(a) and FIG. 15(b). Therefore, fast fallback required for the mmWave system may not be performed. Particularly, considering that the mmWave system operates in a high frequency band and a LoS/NLoS transition occurs fast, the legacy fallback method is not viable for the mmWave system. Accordingly, there is a need for a new procedure for fast determining a LoS/NLoS transition and performing fallback by an mmWave UE and an mmWave BS.

3.1 Fast Fallback Method

Figure 16:
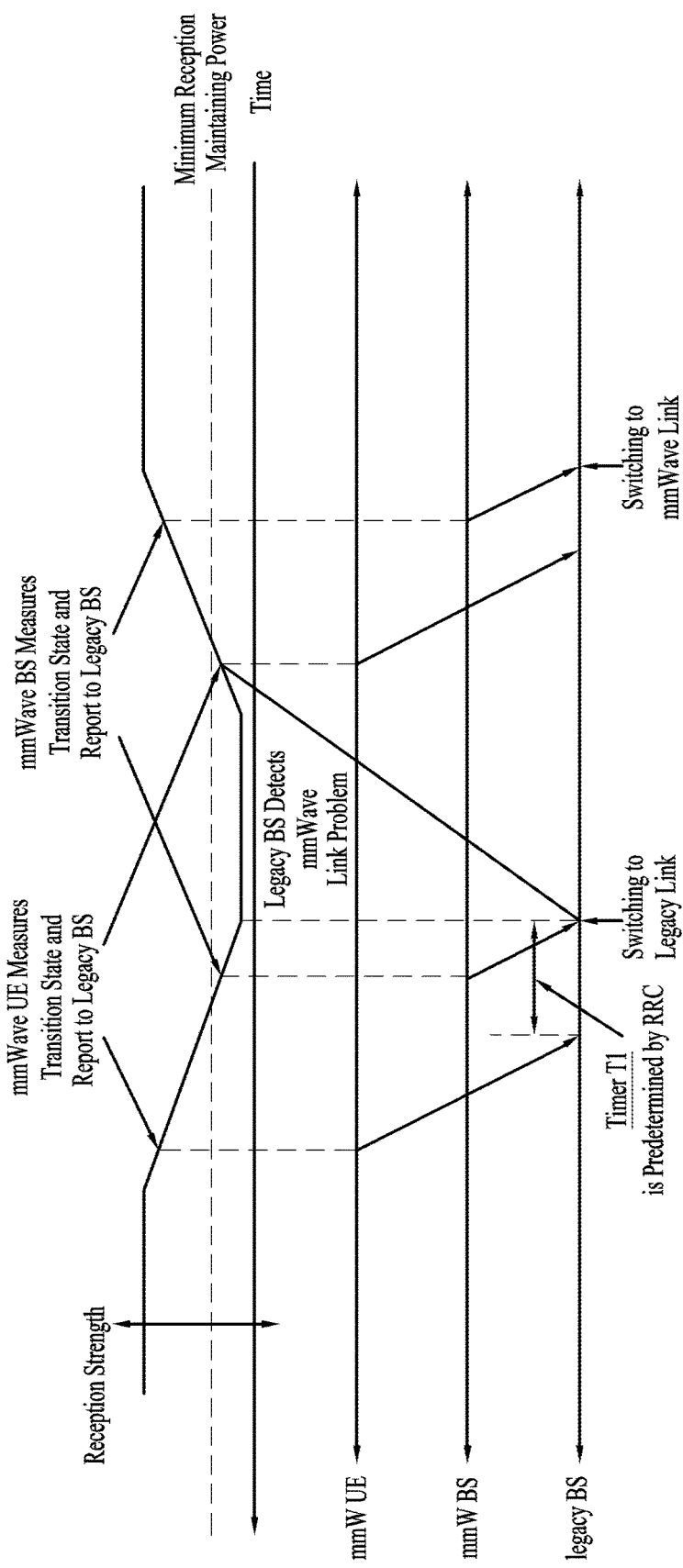
FIG. 16 is a view illustrating a fast fallback method over time.

FIG. 16 is a view illustrating a fast fallback method over time.

Referring to FIG. 16, an mmWave UE may trigger fast fallback. That is, if the mmWave UE determines occurrence of a LoS/NLoS transition by measuring an mmWave DL channel state, the mmWave UE may transmit a fast fallback request message to a legacy BS and/or an mmWave BS.

The mmWave BS may determine whether to configure the mmWave UE to perform fallback, using an uplink reference signal (UL-RS) received on an mmWave UL. If determining that the mmWave UE should perform fallback, the mmWave BS may transmit a fast fallback request message to the legacy BS.

The legacy BS may finally determine whether the mmWave UE is to perform fallback to the legacy BS. That is, upon receipt of the fast fallback request message from each of the mmWave UE and the mmWave BS, the legacy BS may determine that the mmWave UE is to perform fast fallback, determining that a LoS/NLoS transition has occurred on an mmWave link. Therefore, the legacy BS transmits a fallback command message to the mmWave UE, to thereby control the mmWave UE to perform fallback from the mmWave BS to the legacy BS and receive data through the legacy BS.

In FIG. 16, the fast fallback request message that the mmWave UE transmits to the legacy BS and/or the mmWave BS may be referred to as a first fallback request message or a first fast fallback request message, and the fast fallback request message that the mmWave BS transmits to the legacy BS may be referred to as a second fallback request message or a second fast fallback request message.

That is, compared to the conventional technology, the embodiments of the present disclosure may prevent excessive transmissions of an unnecessary 'out of sync' indicator from an mmWave UE by use of two different types of fast fallback request messages transmitted by the mmWave UE and an mmWave BS. Further, the embodiments of the present disclosure may reduce fallback trigger errors from the mmWave BS. Since the legacy BS determines a link state and whether to allow fallback at the moment it receives a fast fallback request from the mmWave BS, a reliable fallback procedure may be performed.

Figure 17:
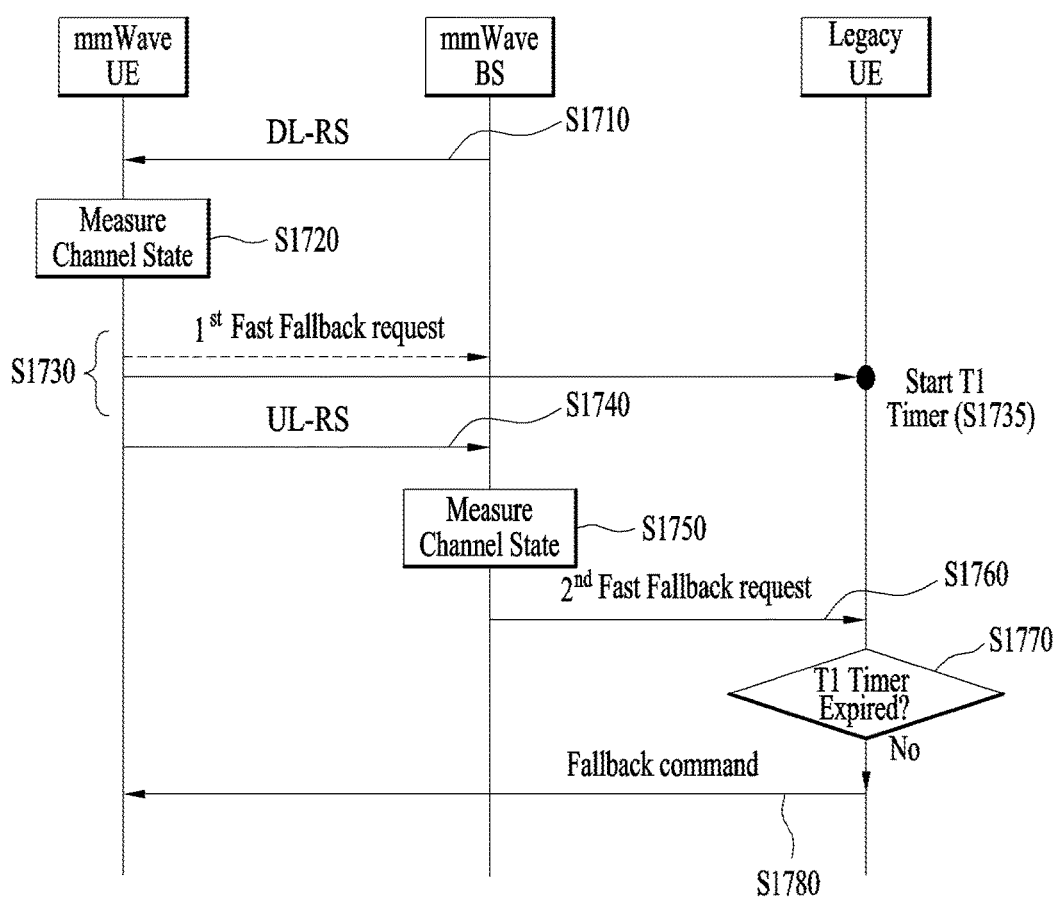
FIG. 17 is another view illustrating a fast fallback procedure.

FIG. 17 is another view illustrating a fast fallback procedure.

The fast fallback procedure of FIG. 17 may be performed based on the description of FIG. 16. In FIG. 17, it is assumed that RRC links are established between an mmWave BS and an mmWave UE and between a legacy BS and the mmWave UE, and control information and data are transmitted and received between the mmWave BS and the legacy BS via a backhaul network (e.g., an Xn interface).

The mmWave BS may semi-statically transmit a DL-RS periodically or in an event-triggered manner via an mmWave link. The DL-RS may be transmitted for the purpose of measuring the channel state of the mmWave link or for any other purpose. Examples of the DL-RS include cell specific RS (CRS), demodulation RS (DM-RS), CSI RS, and mmWave RS defined newly for the mmWave system (S1710).

The mmWave UE may measure a channel state based on the DL-RS. Herein, the mmWave UE may measure and determine a LoS/NLoS transition in the manner described with reference to FIGS. 9, 10, and 11 (S1720).

If determining that a LoS/NLoS transition has occurred in step S1720, the mmWave UE may transmit a first fallback request message to the mmWave BS and/or the legacy BS. Transmission of the fallback request message to the mmWave BS may be optional (S1730).

Upon receipt of the first fallback request message from the mmWave UE, the legacy BS may start a first timer (e.g., a T1 timer or a fallback timer). The first timer counts a time for receiving a second fallback request message from the mmWave BS (S1735).

The mmWave BS may receive a UL-RS from the mmWave UE. The UL-RS is an RS transmitted to measure the channel state of an mmWave UL. The UL-RS may be sounding reference signal (SRS) or mmWave UL RS newly defined to measure an mmWave UL channel (S1740).

The mmWave BS may determine whether a LoS/NLoS transition has occurred by measuring the channel state based on the UL-RS (S1750).

In an aspect of the embodiment, step S1740 may be performed in a different manner depending on the capabilities of the mmWave UE. For example, the mmWave UE may transmit a UL-RS periodically according to its capabilities. Or the mmWave UE may transmit a UL-RS to the BS only when a LoS/NLoS transition has occurred.

In another aspect of the present disclosure, only when receiving the first fallback request message, the mmWave BS may perform step S1740. That is, only when receiving the first fallback request message, the mmWave BS may determine whether a LoS/NLoS transition has occurred to an mmWave UL channel by receiving a UL-RS on the mmWave UL.

Referring to FIG. 17 again, if the mmWave BS determines that a LoS/NLoS transition has occurred in step S1750, the mmWave BS may transmit a second fallback request message to the legacy BS (S1760).

Upon receipt of the second fallback request message, the legacy BS determines whether the first timer started in step S1735 has expired (S1770).

If the first timer still runs in step S1770, the legacy BS determines that the mmWave UE is to perform fallback to the legacy BS, and transmits a fallback command message to the mmWave UE, commanding fallback (S1780).

On the other hand, if the first timer has expired in step S1770, the legacy BS does not perform a fallback procedure, determining that the LoS/NLoS transition state has been released.

Figure 18:
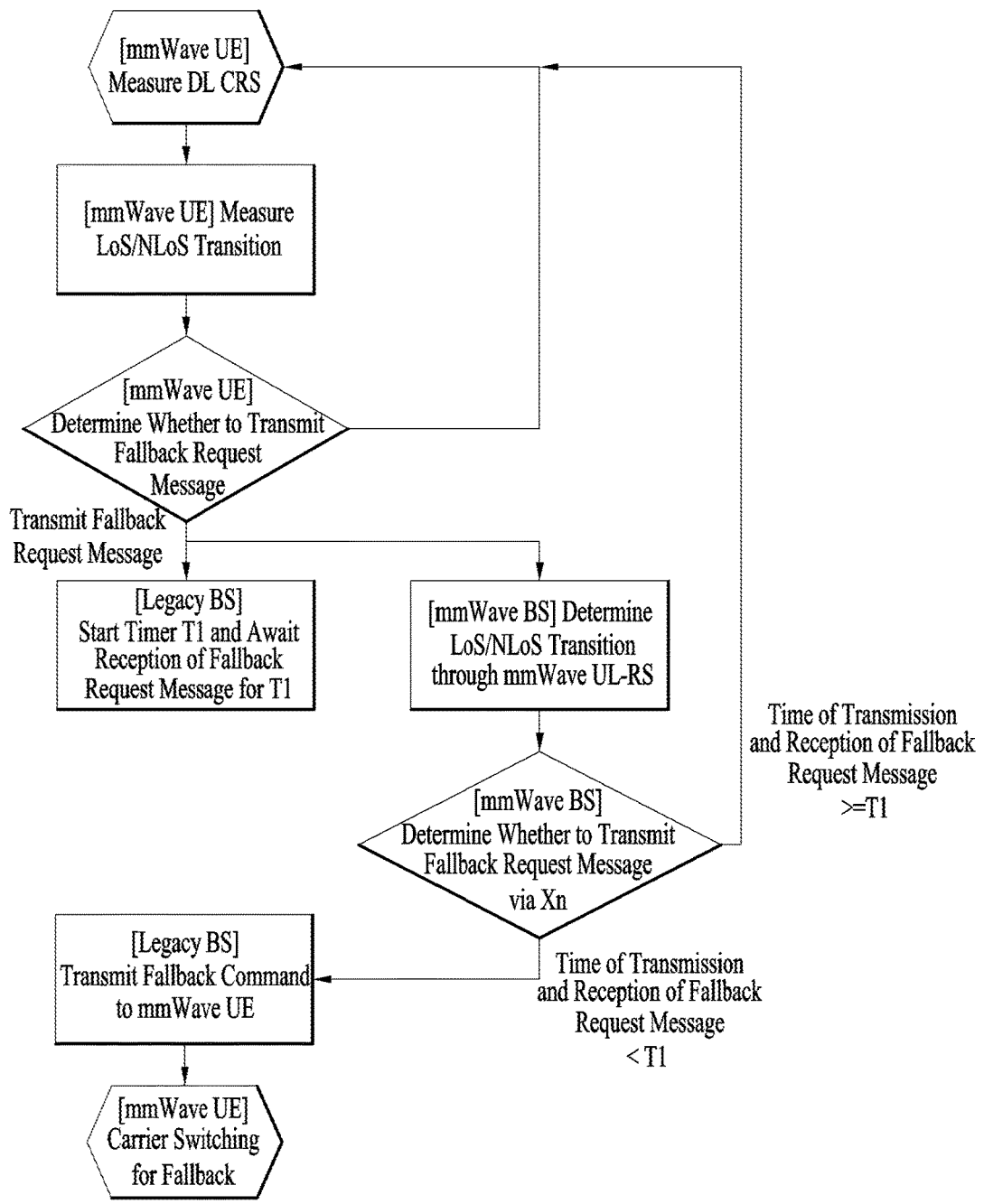
FIG. 18 is a flowchart illustrating a fast fallback procedure.

FIG. 18 is a flowchart illustrating a fast fallback procedure.

Referring to FIG. 18, the mmWave UE measures an mmWave DL CRS received from the mmWave BS, and then determines whether the mmWave link is experiencing a LoS/NLoS transition.

If determining that the mmWave link is experiencing a LoS/NLoS transition, the mmWave UE may transmit a first fallback request message on the legacy UL and/or the mmWave UL.

After receiving the first fallback request message, the legacy BS enables an arbitrary first timer T1 and awaits reception of a second fallback request message from the mmWave BS for T1.

If determining that a LoS/NLoS transition has occurred to the mmWave link, the mmWave UE may be configured to transmit the first fallback request message and a UL-RS to the mmWave BS.

The mmWave BS may determine whether a LoS/NLoS transition has occurred to the mmWave link by measuring the UL-RS.

If determining that the mmWave link is experiencing a LoS/NLoS transition, the mmWave BS may transmit a second fallback request message to the legacy BS.

If the mmWave UE performs fallback to the legacy BS, the mmWave BS may also transmit information about the position (or the packet number) of the starting packet of data packets to be transmitted to the mmWave UE in the second fallback request message.

The legacy BS may determine whether the second fallback request message has been received from the mmWave BS within T1. Upon receipt of the second fallback request message before expiration of T1, the legacy BS may perform fallback to the legacy link. On the other hand, upon receipt of the second fallback request message after expiration of T1, the legacy BS does not perform the fallback procedure. That is, the legacy BS may determine an allowed fallback duration through the T1 timer.

In the following scenarios, the fast fallback procedure of FIGS. 16, 17, and 18 is performed.

(1) The power of an mmWave link signal is decreased to below a minimum received power level and then returns to above the minimum received power level due to frequent movements of an mmWave user. However, a legacy BS should receive a fallback request message from an mmWave BS within T1.

(2) The power of an mmWave link signal is frequently decreased to below a minimum received power level in a dense urban environment (an area densely populated with buildings, persons, various obstacles, and so on). However, a legacy BS should receive a second fallback request message from an mmWave BS within T1.

(3) The power of an mmWave link signal is decreased to below a minimum received power level over a long time due to an obstacle between an mmWave user and an mmWave BS.

In the following scenario, the fast fallback procedure of FIGS. 16, 17, and 18 is not performed.

(1) LoS is already transitioned to NLoS and returned from NLoS within T1 due to an abrupt movement of an mmWave user.

That is, the legacy BS does not receive a second fallback request message from the mmWave BS within T1.

3.2 Method for Setting Fallback Timer

The legacy BS sets a first timer, that is, a fallback timer due to characteristics of an mmWave channel. A LoS/NLoS transition may occur to the mmWave channel very fast due to motion and movement of a person, movement of an object, or the like. That is, if the NLoS state is released fast in spite of the LoS/NLoS transition, keeping an existing mmWave link is helpful to reduction of signaling overhead between an mmWave UE and an mmWave BS, rather than a new mmWave link is established or fallback to the legacy link is performed.

Accordingly, only when the legacy BS activates the T1 timer after receiving a first fallback request message from the mmWave UE, and then receives a second fallback request message from the mmWave BS before expiration of the T1 timer, the legacy BS may perform a fallback procedure, determining that the fallback procedure is meaningful in the embodiments of the present disclosure.

Hereinbelow, methods for setting a T1 timer will be described.

Figure 19:
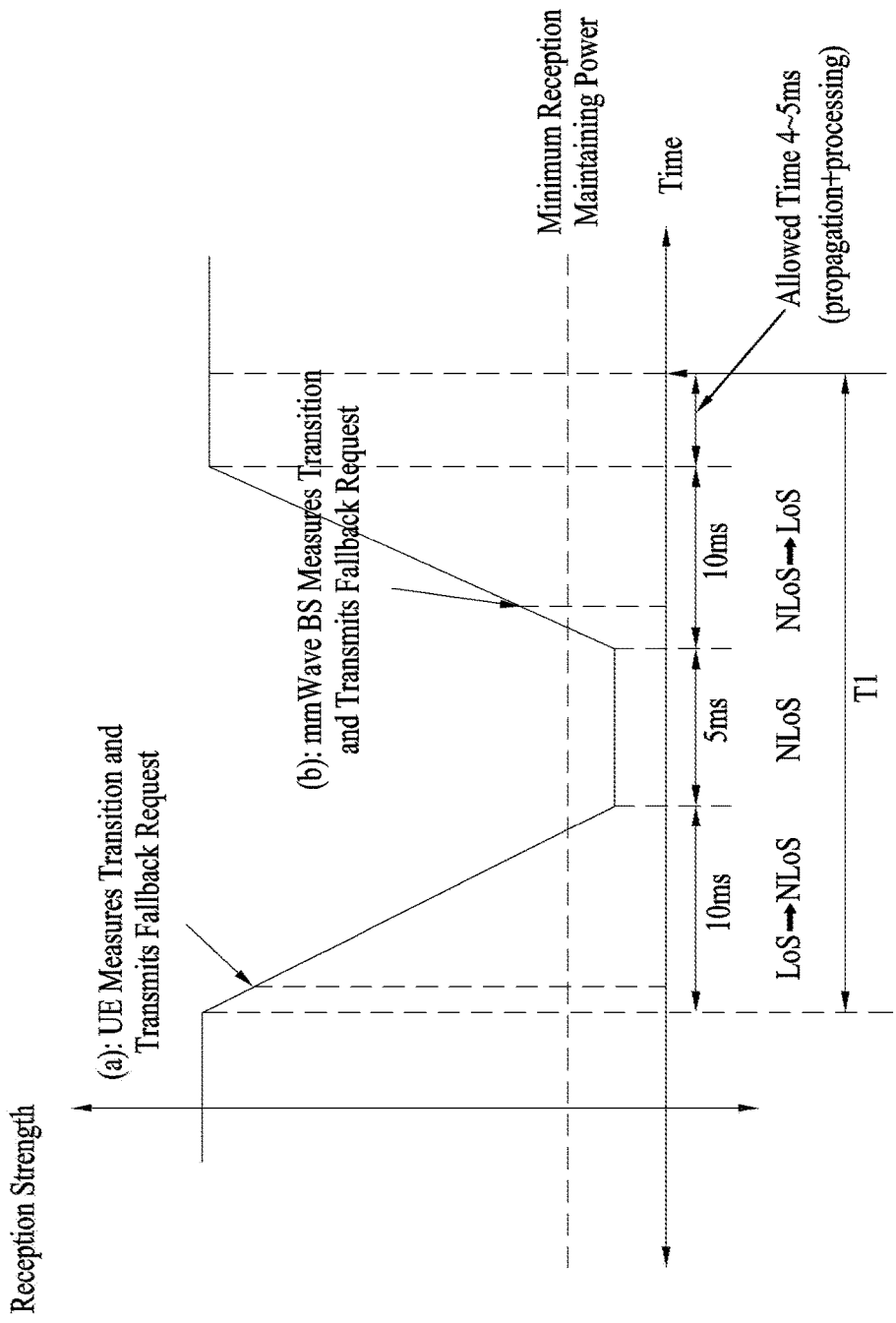
FIG. 19 is a view illustrating a method for setting a fallback timer T1.

FIG. 19 is a view illustrating a method for setting the fallback timer T1.

In FIGS. 16, 17, and 18, after receiving a first fallback request message from the mmWave UE, the legacy BS activates the T1 timer and awaits reception of a second fallback request message from the mmWave BS. Herein, the T1 timer may be predefined in an RRC layer, and shared among the mmWave UE, the mmWave BS, and the legacy BS.

Upon receipt of the second fallback request message from the mmWave BS within T1, the legacy BS performs fallback. On the other hand, if the legacy BS fails to receive the second fallback request message within T1, the legacy BS does not perform fallback.

To set the fallback timer T1 applied to the embodiments of the present disclosure, (1) an allowed LoS/NLoS transition time for an mmWave link, (2) an NLoS duration, (3) an NLoS/LoS return time, and (4) an allowed propagation and processing time for a legacy BS may be considered.

For example, an mmWave UE moving at 10 m/s and an mmWave BS in a 28-GHz band are assumed. Herein, an NLoS state may be assumed to be a minimum link connection duration that allows 5 ms of NLoS. Accordingly, if up to 5 ms for a LoS/NLoS transition, up to 5 ms as an NLoS duration, up to 10 ms for an NLoS/LoS transition, and 5 ms as a propagation and processing time for a legacy BS are considered, the T1 timer may be set to about 30 ms.

However, since the mmWave link returns from NLoS to LoS at time (b) (a reception time of a second fallback request message) within T1, the mmWave BS may not transmit the second fallback request message to the legacy BS.

Therefore, the T1 timer may be set to T1—(3) an NLoS/LoS return time—(4) an allowed propagation and processing time for a legacy BS.

If the mmWave link returns from NLoS to LoS during T1, the mmWave UE does not need to transmit an 'out of sync' or 'in sync' indicator on a UL, and the legacy BS does not need to perform decoding for reception of the 'out of sync' or 'in sync' indicator.

Further, the legacy BS may determine whether to allow the mmWave UE to perform a fallback procedure based on the first and second fallback request messages that the mmWave UE and the mmWave BS transmit after measuring two LoS/NLoS transitions.

3.3 Other Embodiments

In another embodiment of the present disclosure, the mmWave UE may transmit a UL-RS on the mmWave UL, and the mmWave BS receiving the UL-RS may determine whether a LoS/NLoS transition has occurred.

Upon detection of a LoS/NLoS transition, the mmWave BS may transmit a fallback request message to the mmWave UE. Upon receipt of the fallback request message, the mmWave UE may activate a T1 timer and transmit a UL-RS on the mmWave UL within T1.

The mmWave BS may determine again whether a LoS/NLoS transition has occurred by receiving the UL-RS within T1. If determining that a LoS/NLoS transition has occurred, the mmWave BS may transmit a fallback command message to the mmWave UE and the legacy BS. Herein, the mmWave BS may implicitly know the operation of the T1 timer after transmitting the fallback request message. If a LoS/NLoS transition has not occurred within T1, the mmWave BS does not transmit the fallback command message.

Upon receipt of the fallback command message from the mmWave BS within T1, the mmWave UE may perform fallback to the legacy BS and transmit and receive data to and from the legacy BS.

In another embodiment of the present disclosure, the mmWave UE may determine whether a LoS/NLoS transition has occurred by receiving a DL-RS from the mmWave BS. Upon detection of an NLoS state, the mmWave UE transmits a fallback request message to the mmWave BS. Further, the mmWave UE transmits a UL-RS to the BS on the mmWave UL.

Upon receipt of the fallback request message, the mmWave BS may activate the T1 timer, receive the UL-RS within T1, and determine whether a LoS/NLoS transition has occurred. Upon detection of an NLoS state within T1, the mmWave BS transmits a fallback command message to the mmWave UE and the legacy BS.

Since the mmWave UE transmits the fallback request message, the mmWave BS may implicitly determine the operation time of the T1 timer. Upon receipt of the fallback command message within T1, the mmWave UE may perform fallback to the legacy BS. Subsequently, the mmWave UE may transmit and receive data to and from the legacy BS.

Upon receipt of the fallback command message from the mmWave BS, the legacy BS performs the fallback procedure with the mmWave UE and transmit and receive data to and from the mmWave UE via the legacy link.

In the embodiments of the present disclosure, since it is assumed that radio bearers (i.e., RRC connections) have already been established among the mmWave UE, the mmWave BS, and the legacy BS, if the legacy BS receives the fallback command message from the mmWave BS, the legacy BS may transmit and receive legacy data to and from the mmWave UE.

3.4 Method for Performing Fast Fallback Procedure in Cellular Environment

Although an mmWave link may be configured to operate in an ultra-high frequency area, it may also be applied to a low-frequency area, that is, a cellular environment. Therefore, while the embodiments of the present disclosure are designed in consideration of mmWave link-based LoS/NLoS transition characteristics, they are also applicable to a low-frequency environment, if the power of a low-frequency link is decreased to below a minimum link maintaining power during a LoS/NLoS transition.

That is, the processing load of a legacy UE may be reduced, a link state may be fast measured, and whether a link failure has occurred may be determined fast, by applying the foregoing embodiments of the present disclosure to a special situation under the low-frequency environment.

Figure 20:
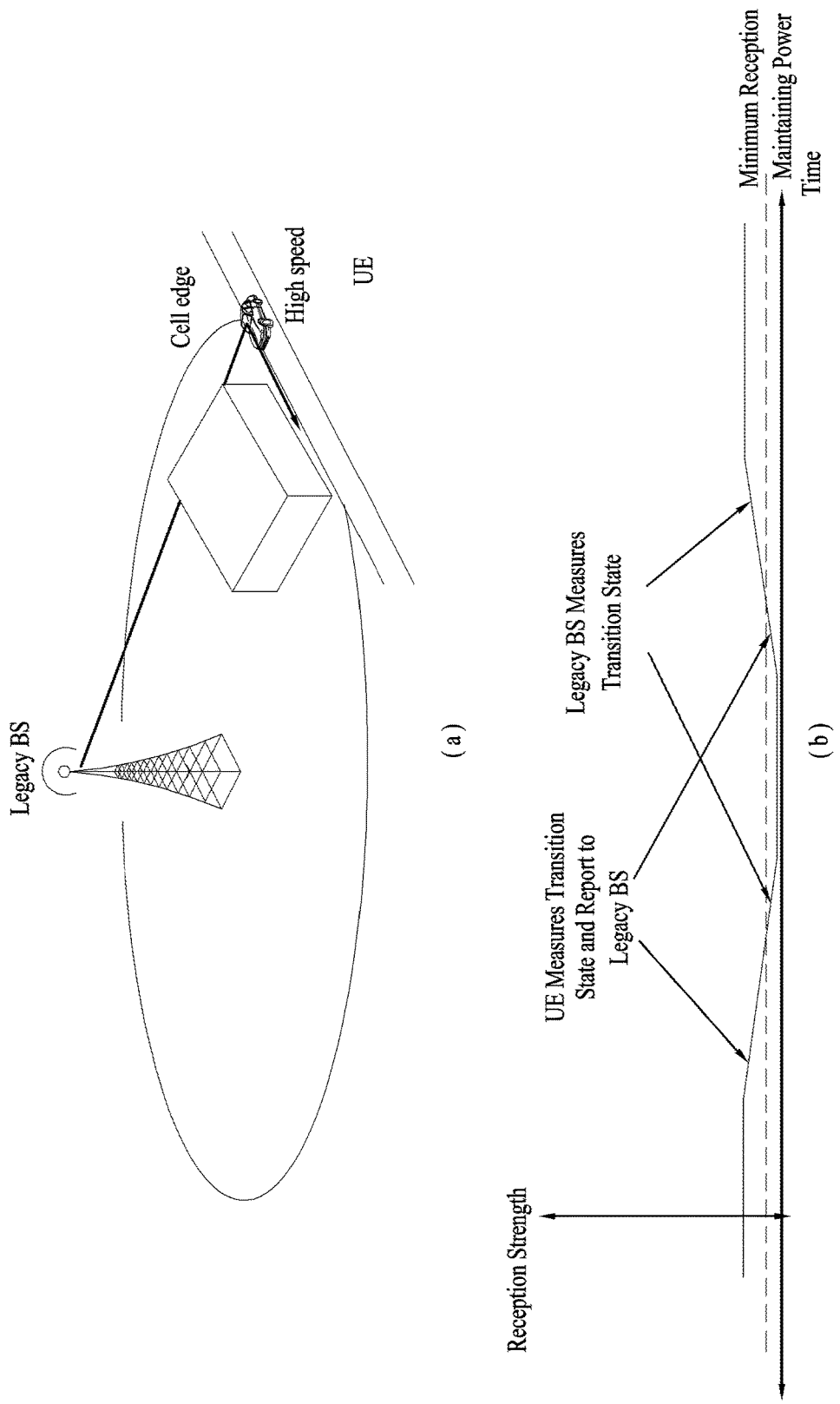
FIG. 20 is a view illustrating a case in which received power is rapidly decreased to below a minimum received power in a low frequency band.

For example, if a UE moves at a high speed from a cell edge to a shadowing area in a low frequency band, received power may be decreased rapidly to below a minimum received power as observed from an mmWave link. FIG. 20 is a view illustrating a case in which received power is decreased rapidly to below a minimum received power in a low frequency band.

As illustrated in FIG. 20(a), if a low-frequency link UE suddenly moves at a high speed from a cell edge to a shadowing area, a similar situation to transition of an mmWave link to NLoS may occur although not rapidly. That is, legacy link power is decreased to below a minimum received power and it takes a long time for a legacy UE to determine the link state by the legacy link recovery method (refer to the description of FIG. 12). Therefore, the link recovery procedure may not be performed efficiently, and the received signal performance of the UE may be degraded. This problem may be overcome by applying the above-described fallback procedure for an mmWave link to the environment described with reference to FIG. 20(a).

For example, if the legacy UE determines by CRSs that a LoS/NLoS transition has occurred, the legacy UE may transmit a fallback request message to the legacy BS. Herein, the legacy UE may transmit a UL-RS on a UL along with the fallback request message. The legacy BS may determine whether a LoS/NLoS transition has occurred to the link, based on the fallback request message and the UL-RS. Therefore, the legacy BS may determine that the legacy UE is to perform handover to another BS.

Figure 21:
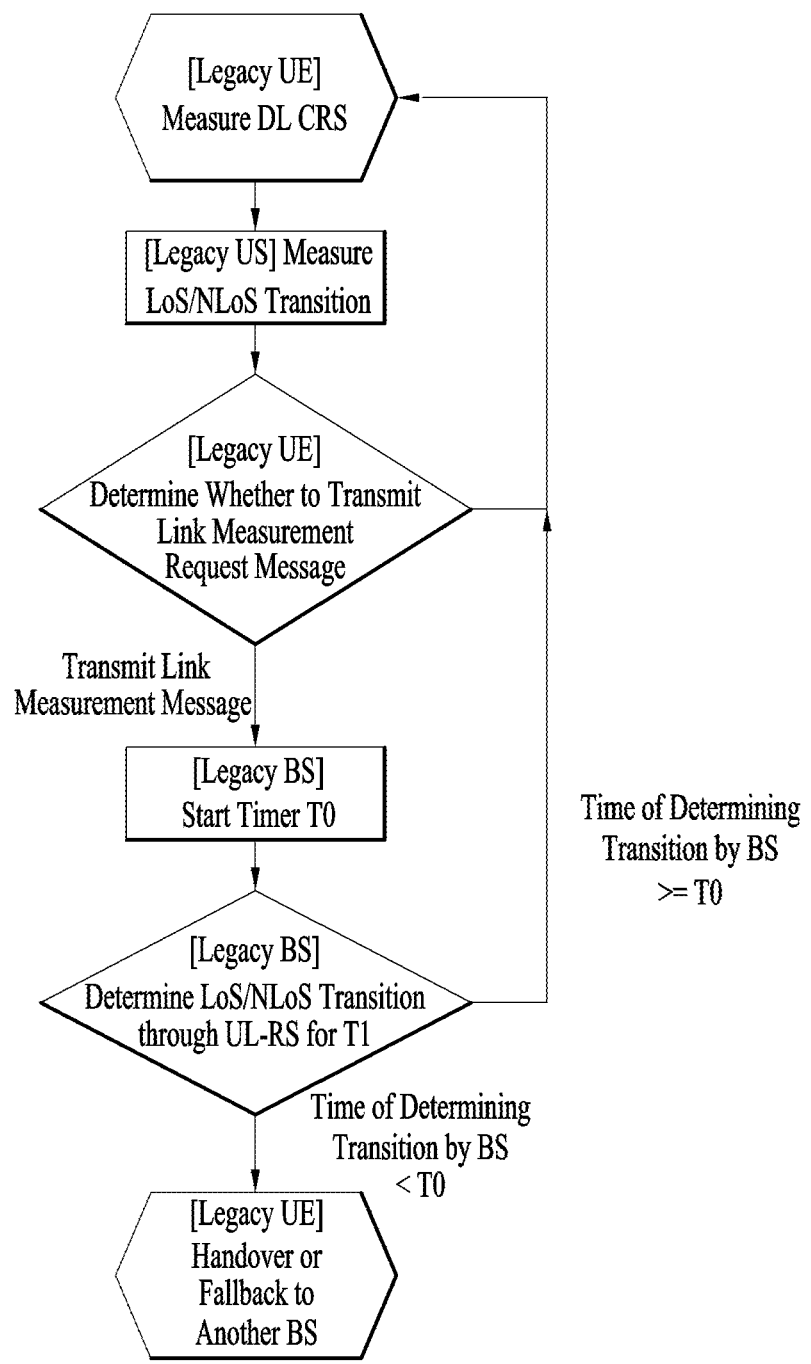
FIG. 21 is a view illustrating a method for applying embodiments of the present disclosure to a legacy system.

FIG. 21 is a view illustrating a method for applying the embodiments of the present disclosure to a legacy system.

Referring to FIG. 21, a legacy UE may measure a channel state by receiving a DL-RS (for example, CRS) on a DL.

If the legacy UE determines that the link has transitioned from LoS to NLoS, the legacy UE may determine whether to transmit a link measurement request message, and transmit the link measurement request message to a legacy serving BS.

Upon receipt of the link measurement request message, the legacy BS may activate a T0 timer.

The legacy BS may determine whether a LoS/NLoS transition has occurred by receiving a UL-RS from the legacy UE within T0.

If determining based on the UL-RS received during T0 that a LoS/NLoS transition has occurred, the legacy serving BS may determine that the legacy UE is to perform handover to a target BS. Therefore, the legacy serving BS may indicate handover to the legacy UE by transmitting a handover indication message or a fallback command message.

On the other hand, if the NLoS state has been released within T0, the legacy UE may not transmit the UL-RS any longer. If the legacy serving BS has not received the UL-RS sufficiently within T0, the legacy serving BS does not determine that the legacy UE is to perform handover.

4. Apparatuses

The apparatuses illustrated in FIG. 22 are means for implementing the methods described with reference to FIGS. 1 to 21.

A UE may act as a transmitter on UL and as a receiver on DL. An eNB may act as a receiver on UL and as a transmitter on DL.

That is, the UE and the eNB may include transmitters 2240 and 2250, and receivers 2250 and 2270 to control transmission and reception of information, data, and/or messages, and antennas 2200 and 2210 to transmit and receive information, data, and/or messages.

Further, the UE and the eNB may include processors 2220 and 2230 for implementing the foregoing embodiments of the present disclosure, and memories 2280 and 2290 for storing data generated during processing of the processors 2220 and 2230 temporarily or permanently.

The embodiments of the present disclosure may be performed through the components and functions of the above-described UE and eNB. For example, the processor of a legacy eNB and/or an mmWave eNB may generate resource information required to transit a fallback request message to an mmWave UE, and transmit the resource information by controlling the transmitter in the methods disclosure in Clauses 1, 2, and 3 in combination. The processor of an mmWave UE may determine whether a LoS/NLoS transition has occurred by measuring and determining a channel state, and transmit a first fallback request message and/or a UL RS to the mmWave eNB and/or the legacy eNB. After receiving the first fallback request message, the processor of the legacy BS may activate a fallback timer T1 and determine whether a second fallback request message has been received from the mmWave BS within T1. Upon receipt of the second fallback request message from the mmWave BS within T1, the legacy BS performs a fallback procedure. On the contrary, if the legacy BS has not received any message within T1, the legacy BS may not perform the fallback procedure. For further details, refer to Clauses 1, 2, and 3.

The transmitters and the receivers of the UE and the eNB may perform a packet modulation/demodulation function for data transmission, a high-speed packet channel coding function, OFDMA packet scheduling, TDD packet scheduling, and/or channelization. Each of the UE and the eNB of FIG. 22 may further include a low-power radio frequency (RF)/intermediate frequency (IF) module.

In the present disclosure, the UE may be any of a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2280 or 2290 and executed by the processor 2220 or 2230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems. Examples of the various wireless access systems include 3GPP, 3GPP2, and/or IEEE 802.xx system. The embodiments of the present disclosure are applicable to all technical fields which are applications of the various wireless access systems as well as the various wireless access systems.

The invention claimed is:

1. A method for supporting fast fallback of a millimeter wave (mmWave) user equipment (UE) by a legacy base station (BS) in a wireless access system supporting mmWave, the method comprising:
   receiving, from the mmWave UE, a first fallback request message requesting fast fallback;
   activating a fallback timer to determine whether to perform fallback, after receiving the first fallback request message; and
   determining whether a second fallback request message requesting fast fallback has been received from an mmWave BS within a value of the fallback timer,
   wherein upon receipt of the second fallback request message within the value of the fallback timer, a fallback command message commanding fast fallback is transmitted to the mmWave UE, and upon expiration of the fallback timer, the fast fallback is not performed.

2. The method according to claim 1, wherein the fallback timer is set in consideration of a line of sight (LoS)/non-LoS transition time allowed for an mmWave link, an NLoS state duration, an NLoS/LoS transition time, and a propagation delay and processing delay time of the legacy BS.

3. The method according to claim 2, wherein the mmWave UE determines whether a LoS/NLoS transition has occurred based on a downlink reference signal (DL-RS) received from the mmWave BS.

4. The method according to claim 2, wherein the first fallback request message is also transmitted to the mmWave BS.

5. The method according to claim 2, wherein after the mmWave UE measures whether a LoS/NLoS transition has occurred based on an uplink reference signal (UL-RS) transmitted to the mmWave BS, the second fallback request message is transmitted.

6. A legacy base station (BS) for supporting fast fallback of a millimeter wave (mmWave) user equipment (UE) in a wireless access system supporting mmWave, the legacy BS comprising:
   a transmitter;
   a receiver; and
   a processor operatively connected to the transmitter and the receiver and configured to support the fast fallback,
   wherein the processor is configured to receive, from the mmWave UE, a first fallback request message requesting fast fallback by controlling the receiver, to activate a fallback timer to determine whether to perform fallback, after receiving the first fallback request message, and to determine whether a second fallback request message requesting fast fallback has been received from an mmWave BS within a value of the fallback timer, and wherein upon receipt of the second fallback request message within the value of the fallback timer, a fallback command message commanding fast fallback is transmitted to the mmWave UE, and upon expiration of the fallback timer, the fast fallback is not performed.

7. The legacy BS according to claim 6, wherein the fallback timer is set in consideration of a line of sight (LoS)/non-LoS transition time allowed for an mmWave link, an NLoS state duration, an NLoS/LoS transition time, and a propagation delay and processing delay time of the legacy BS.

8. The legacy BS according to claim 7, wherein the mmWave UE determines whether a LoS/NLoS transition has occurred based on a downlink reference signal (DL-RS) received from the mmWave BS.

9. The legacy BS according to claim 7, wherein the first fallback request message is also transmitted to the mmWave BS.

10. The legacy BS according to claim 7, wherein after the mmWave UE measures whether a LoS/NLoS transition has occurred based on an uplink reference signal (UL-RS) transmitted to the mmWave BS, the second fallback request message is transmitted.

\* \* \* \* \*